(12) United States Patent
Tseng et al.

(10) Patent No.: US 12,536,788 B2
(45) Date of Patent: Jan. 27, 2026

(54) TRACKING DIET AND NUTRITION USING WEARABLE BIOLOGICAL INTERNET-OF-THINGS

(71) Applicant: THE REGENTS OF THE UNIVERSITY OF CALIFORNIA, Oakland, CA (US)

(72) Inventors: Peter Tseng, Oakland, CA (US); Mohammad Al Faruque, Oakland, CA (US); Fadi Kurdahi, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1291 days.

(21) Appl. No.: 17/293,894

(22) PCT Filed: Nov. 15, 2019

(86) PCT No.: PCT/US2019/061787
§ 371 (c)(1),
(2) Date: May 13, 2021

(87) PCT Pub. No.: WO2020/102713
PCT Pub. Date: May 22, 2020

(65) Prior Publication Data
US 2022/0013212 A1 Jan. 13, 2022

Related U.S. Application Data

(60) Provisional application No. 62/768,726, filed on Nov. 16, 2018.

(51) Int. Cl.
*A61B 5/00* (2006.01)
*G01L 1/16* (2006.01)
(Continued)

(52) U.S. Cl.
CPC .............. *G06V 10/94* (2022.01); *A61B 5/682* (2013.01); *G01L 1/16* (2013.01); *G01N 33/02* (2013.01);
(Continued)

(58) Field of Classification Search
CPC .... A61B 5/14532; A61B 5/682; G09B 9/005; G09B 19/002
See application file for complete search history.

(56) References Cited

U.S. PATENT DOCUMENTS 5,263,491 A 11/1993 Thornton
9,114,064 B2 8/2015 Kountotsis et al.
(Continued)

OTHER PUBLICATIONS

Malon RS, Sadir S, Balakrishnan M, Córcoles EP. Saliva-based biosensors: noninvasive monitoring tool for clinical diagnostics. Biomed Res Int. 2014;2014:962903. doi:10.1155/2014/962903 (Year: 2014).*

(Continued)

*Primary Examiner* — Robert J Utama
(74) *Attorney, Agent, or Firm* — FOLEY & LARDNER LLP

(57) ABSTRACT

A system for tracking diet and nutrition includes an oral module configured to be affixed within a mouth of a user and including a set of salivary sensors responsive to a level of at least one nutrient. The system also includes a set of eating event sensors responsive to an eating event. The set of eating event sensors can be included in the oral module, or can be included in a body module configured to be affixed adjacent to a body part of the user.

16 Claims, 22 Drawing Sheets

(51) Int. Cl.
  *G01N 33/02*  (2006.01)
  *G06F 18/25*  (2023.01)
  *G06N 20/00*  (2019.01)
  *G06V 10/94*  (2022.01)
  *G06V 20/68*  (2022.01)
  *G09B 19/00*  (2006.01)
  *G16H 20/60*  (2018.01)
  *H01P 7/08*   (2006.01)
  *H04W 4/38*   (2018.01)

(52) U.S. Cl.
  CPC ........... *G06F 18/253* (2023.01); *G06N 20/00* (2019.01); *G06V 20/68* (2022.01); *G09B 19/0092* (2013.01); *G16H 20/60* (2018.01); *H01P 7/082* (2013.01); *H04W 4/38* (2018.02); *A61B 2562/0204* (2013.01)

(56) References Cited

U.S. PATENT DOCUMENTS

| | | | |
|---|---|---|---|
| 9,538,657 | B2 | 1/2017 | Potyrailo et al. |
| 2010/0049274 | A1* | 2/2010 | Cholette ............... A61B 5/392 |
| | | | 607/40 |
| 2011/0276312 | A1 | 11/2011 | Shalon et al. |
| 2014/0276546 | A1* | 9/2014 | Connor ............... A61M 5/1723 |
| | | | 604/503 |
| 2016/0012749 | A1* | 1/2016 | Connor .................... A61B 5/24 |
| | | | 600/27 |
| 2016/0026767 | A1 | 1/2016 | Sarrafzadeh et al. |
| 2016/0317060 | A1 | 11/2016 | Connor |
| 2016/0338626 | A1 | 11/2016 | Wang et al. |
| 2019/0298234 | A1* | 10/2019 | Omenetto ............ G01N 27/028 |

OTHER PUBLICATIONS

International Search Report and Written Opinion on PCT Application No. PCT/US2019/061787 dated Jan. 29, 2020, 9 pages.

* cited by examiner

TRACKING DIET AND NUTRITION USING WEARABLE BIOLOGICAL INTERNET-OF-THINGS

CROSS-REFERENCE TO RELATED APPLICATIONS

This application is a U.S. national phase application filed under 35 U.S.C. § 371 claiming the benefit of International Application No. PCT/US2019/061787, filed Nov. 15, 20219; which claims the benefit of U.S. Provisional Application No. 62/768,726, filed Nov. 16, 2018, the contents of each of which are incorporated herein by reference in their entirety.

TECHNICAL FIELD

This disclosure generally relates to systems and methods for tracking diet and nutrition.

BACKGROUND

Diet and nutritional intake plays a significant role in the maintenance of the body, with a healthy diet associated with many positive markers of human health including—but not limited to—reduced risk and improved maintenance of disease, improved mood, reduced inflammation, improved physical performance, increased muscle mass, and more. During food consumption, it is the nutrients consumed (e.g., water, salt, fats, protein and alcohol) that sustain daily functions such as providing energy, growing tissue, and maintaining cellular function. Maintenance of nutritional intake is linked to the health of the body, with rate-ratio-quantity of nutrient consumption all playing important roles in bodily performance.

Despite the importance of diet in human health, the monitoring of intake is largely self-tracked and unreliable. Currently, there is lack of an adequate automated method that can provide an accurate, low user-burden technique of quantifying the foods, nutrients, or calories people consume. Many approaches revolve around personal-device-assisted self-assessment—additional iterations may include the use of photography, and more recently sensors mounted on the throat to track swallowing. Beyond being unreliable measures of diet, other techniques are inadequate to track the underlying nutrients of food due to significant variation in the nutritional value from food product to food product.

It is against this background that a need arose to develop the embodiments described herein.

SUMMARY

Embodiments of this disclosure are directed to a wearable platform to quantitatively track nutrition from within the food people eat. This platform is built around the central hypothesis that passive, multi-modal data drawn from a combination of wearable sensors can improve on techniques to quantitatively track nutrition and diet. Taken together, such sensors can capture multiple fundamental aspects of food people consume including its underlying nutrients, texture, consistency, and its composition. Note that such a strategy resolves the constraints of individual sensors subtypes, that on their own might be unable to capture the complex qualities of human diet. This can be accomplished with the machine-learning fusion of data from multiple (e.g., four) sensor types, such as: (a) Highly deformable strain gauge—jaw movements, (b) Piezoelectric/Acoustic—throat swallowing, and (c) Interlayer-Radio-Frequency Identification (RFid)—quantifying nutrients from food itself. Such sensors can be built into a wearable Biological Internet-of-Things (bio-IoT) to continuously and wirelessly track personalized habits in intake. Functional, human body-focused embedded systems can be built around storing, securing, and analyzing biosensor data.

Some embodiments are implemented as a simple-to-wear, disposable 2-module system with module 1 tagged to the neck, and a small wireless/biocompatible module 2 affixed to a tooth with dental glue. This will be implemented through specific aims, focused on: (1) biosensor development and validation, (2) electronics design, and (3) biometric machine learning. This will be operable "in-the-fog," or omitting external input or storage.

In some embodiments, a system for tracking diet and nutrition includes: (1) an oral module configured to be affixed within a mouth of a user and including a set of salivary sensors responsive to a level of at least one nutrient; and (2) a body module configured to be affixed adjacent to a body part of the user and including a set of eating event sensors responsive to an eating event.

In additional embodiments, a system for tracking diet and nutrition includes: (1) an oral module configured to be affixed within a mouth of a user and including: (a) a set of salivary sensors responsive to a level of at least one nutrient; and (b) a set of eating event sensors responsive to an eating event.

In further embodiments, a computer-implemented method for tracking diet and nutrition of a user includes: (1) detecting eating activities of the user from output signals of a set of eating event sensors affixed to the user; (2) identifying temporal information associated with the eating activities; (3) deriving information regarding a level of at least one nutrient consumed by the user during the eating activities from output signals of a set of salivary sensors affixed within a mouth of the user; and (4) fusing or merging the information regarding the level of the at least one nutrient and the temporal information associated with the eating activities to identify a composition or consistency of a food consumed by the user during the eating activities.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION a. Rationale

Figure 1:
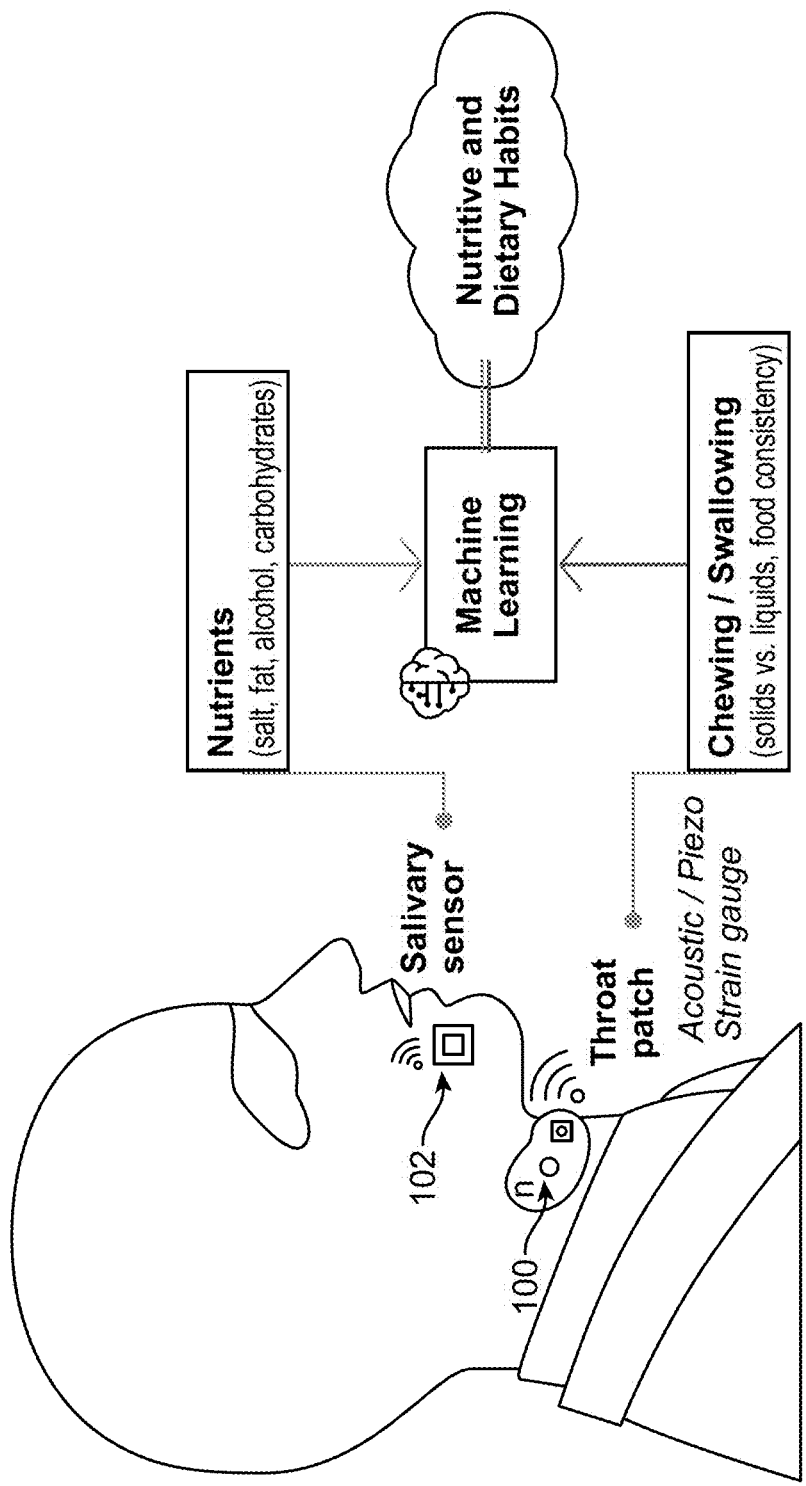
FIG. 1. Diagram of proposed wearable biological Internet-of-Things (bio-IoT) to quantitatively monitor nutrition and diet. Quantitative metrics tracked continuously by multiple biosensors are stored and subsequently analyzed using machine learning.

Nutrition and diet play a significant role in the maintenance of the body, with a healthy diet associated with broad, positive markers of human health including—but not limited to—reduced risk and improved maintenance of disease, improved mood, reduced inflammation, improved physical performance, increased muscle mass, and more. During food consumption, it is the nutrients that people consume (e.g., water, salt, fats, protein and alcohol) that sustain daily functions such as providing energy, growing tissue, and maintaining cellular function. Maintenance of nutrient intake is linked to the health of the body, with rate-ratio-quantity of nutrient consumption all playing important roles in bodily performance. Underlying this performance are effects that nutrients play on disease state, epigenetics, or organ degradation. For example, overconsumption of salt is linked to hypertension, gastric cancer, and reduced cardiovascular health. Under consumption of water can lead to impaired cognition and is correlated to obesity. Ratio of the consumption of nutrients affects muscle growth and cardiovascular health. Even general regulation of these nutrients such as feed-fast cycles (with intermittent fasting) and caloric restriction has been observed to affect the behavior of the body.

Despite the importance of diet in human health, the monitoring of intake remains largely self-tracked and unreliable. Currently, no adequate automated method can provide an accurate, low user-burden technique of quantifying the foods, nutrients, or calories people consume. Many revolve around personal-device-assisted self-assessment—additional iterations may include the use of photography, and more recently sensors mounted on the throat to track swallowing. Such techniques fundamentally possess one or more of a number of drawbacks including: (1) long interaction time, (2) lack of accuracy, and (3) lack of automation. While patient-burden remains the most significant issue with many of such techniques, issues with accuracy should not be underestimated. Beyond being unreliable measures of diet, other techniques are inadequate to track the underlying nutrients of food due to significant variation in the nutritional value from food product to food product. For example, the salt and fat content may vary significantly across different pieces of steak. Throat sensors or photographic techniques are inadequate to probe nutrients directly from food, and are incapable of correctly handling many processed food types (such as bars—protein vs. grain, chips—apple vs. potato, or crackers that are prevalent in many Ready-to-Eat Meals (MREs)). In addition, purely photographic techniques involve significant memory and/or computational power to perform their tasks. Fundamentally, tracking nutrition at the point of input to the body is the way of truly monitoring an individual's intake.

Technologies are desired that can act at the point of food input to track and quantify nutrients (or diet) as they are being consumed. Such tools can conclusively track how nutrient over and under consumption, consumption rate/ratio, or consumption cycle link to human health. These technologies can be utilized in numerous applications by nutritionists, clinicians, or the broader public. These devices can connect with personalized toolkits for tracking wellness, empowering individuals/patients to better understand and control their own bodies.

An underlying technology is a bio-functional sensor, termed an interlayer-RFid, that can be utilized to track nutrients—such as salt, sugar, alcohol/oil—in-vivo from within the mouth. Such a sensor allows continuous assessment of multiple nutrient types from food itself at the point of input.

b. Proposed Device

This proposed device is built around the central hypothesis that passive, multi-modal data drawn from a combination of wearable sensors (FIG. 1, a Biological Internet-of-Things, in this embodiment probing saliva, the throat, and jaw muscles) can improve on techniques to quantitatively track nutrition/diet. Taken together, such sensors can capture multiple fundamental aspects of food people consume including its underlying nutrients, texture, consistency, and its composition. Note that such a strategy resolves the constraints of individual sensors sub-types, that on their own might be unable to capture the complex qualities of human diet.

The proposed device is a wearable platform to quantitatively track nutrition from within the food people consume, and can probe multiple, fundamental aspects of the food people consume. This can be accomplished with the machine-learning fusion of data from multiple (e.g., three) sensor types: (I) Highly deformable strain gauge—jaw movements, (2) Piezoelectric/Acoustic—throat swallowing (which in combination with (I) operate as a set of eating event sensors), and (3) Interlayer-RFid—quantifying nutrients from food itself. Such sensors can be built into a wearable Bio-IoT to continuously and wirelessly track personalized habits in intake.

Functional, human body-focused embedded systems can be built around storing, securing, and analyzing biosensor data. These systems can be implemented in a modular format, so that various sensor sub-types can be added or removed from the system to enhance the potential functionality of the system. For example, an electromyogram (EMG) sensor sub-type can potentially be added to the system to obtain additional information on jaw activation. Hormone electrochemical sensors can potentially be integrated into the platform to co-measure biological markers within the saliva.

Figure 2:
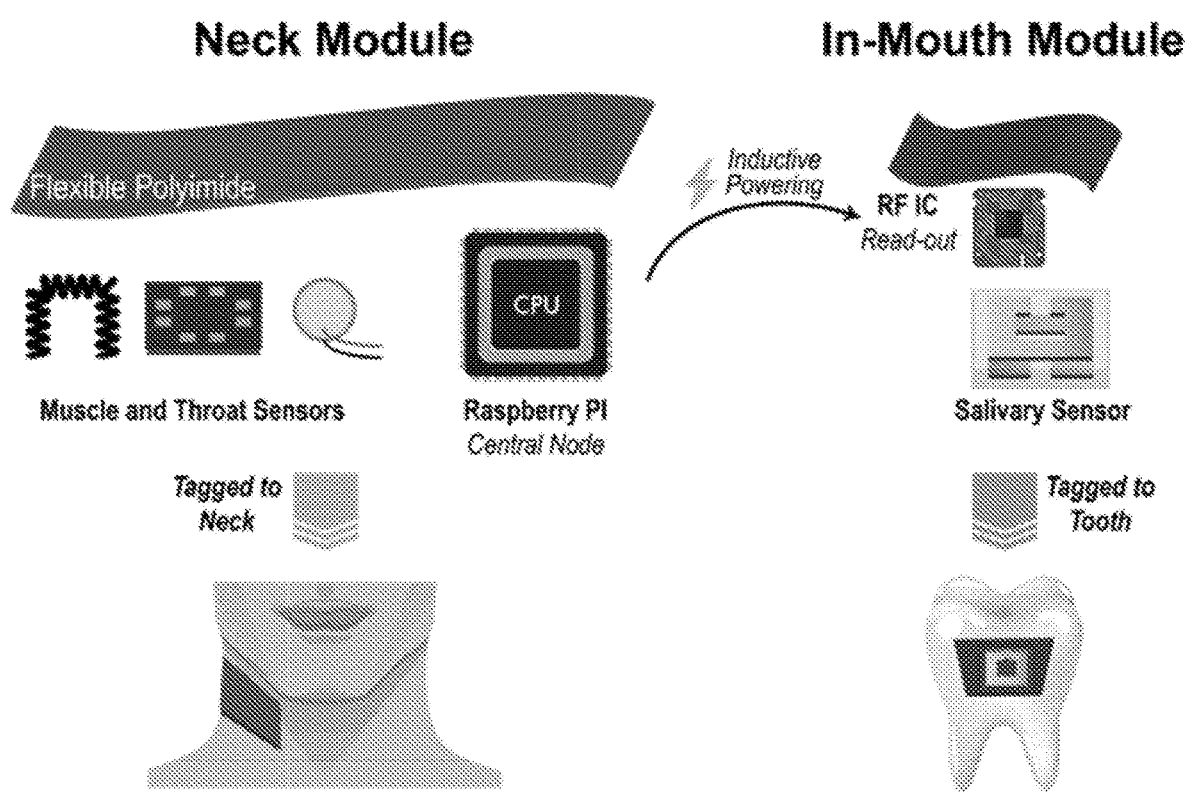
FIG. 2. Core components of a system. An ARM-based central node inductively powers a Radio-Frequency Identification (RFid) and receives sensor data from neck and in-mouth modules. This node additionally performs machine learning tasks to parse sensor data. Modules can be built on flexible substrates in compact formats so as to reduce user burden.

A base embodiment can be implemented as a simple-to-operate, 2-component device that can operate "in-the-fog," namely as a self-contained system while omitting external input or storage. The first component 100 is a flexible neck module (e.g., a body module in the form of a throat patch) that can contain a computing node and several sensor sub-types to monitor the jaw and throat. The second component is a small, wirelessly-powered radio-frequency sensor/read-out circuit combination that can continuously monitor the oral environment (and is an oral or in-mouth module). The user can tag the flexible patch to the neck, and subsequently affix this in-mouth module on a tooth with dental glue—the platform can then be operational. Both components 100 and 102 can be structurally flexible and disposable (the in-mouth module can be electronically sealed and additionally be made to be ingestible similar to electronic pills), and can be controlled by a central (e.g., ARM-based processor) system on a chip computing node (FIG. 2) that can receive, process, perform machine learning procedures, and power sensing systems as specified. An extended embodiment can utilize computing smart glasses as a central node to additionally gather visual data from the surrounding environment.

Figure 3:
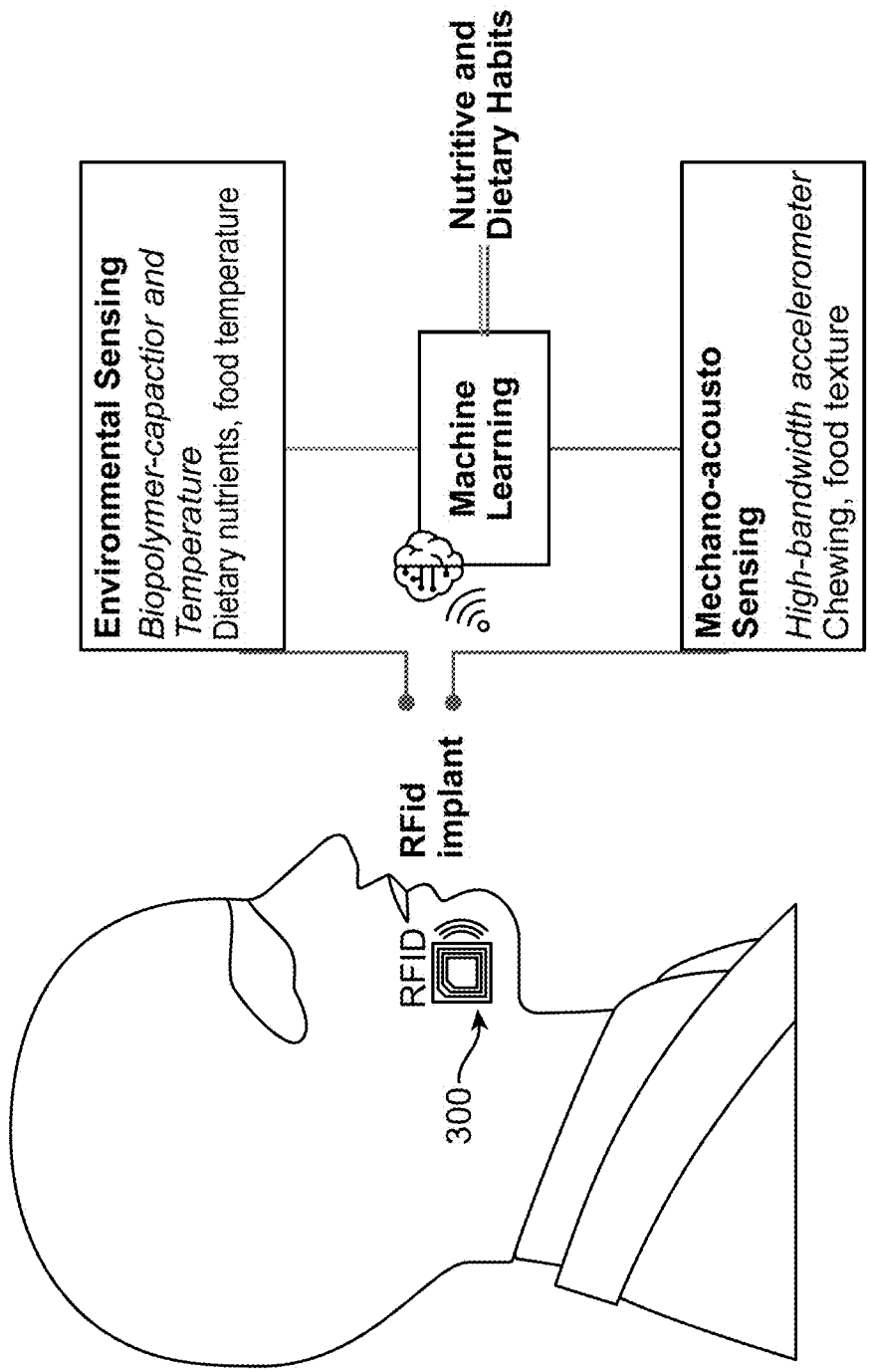
FIG. 3. Diagram of another proposed wearable bio-IoT to quantitatively monitor nutrition and diet. A single RFid tag to be implanted in the mouth includes integrated analytical and physical sensors to monitor an oral environment. This includes a partially-selective analytical sensor to monitor saliva, as well as temperature, mechano-acoustic sensors to monitor physical properties of food or patient chewing during intake. Data from these sensors is parsed using integrated microelectronics, and analyzed off-chip using machine learning.
Figure 4:
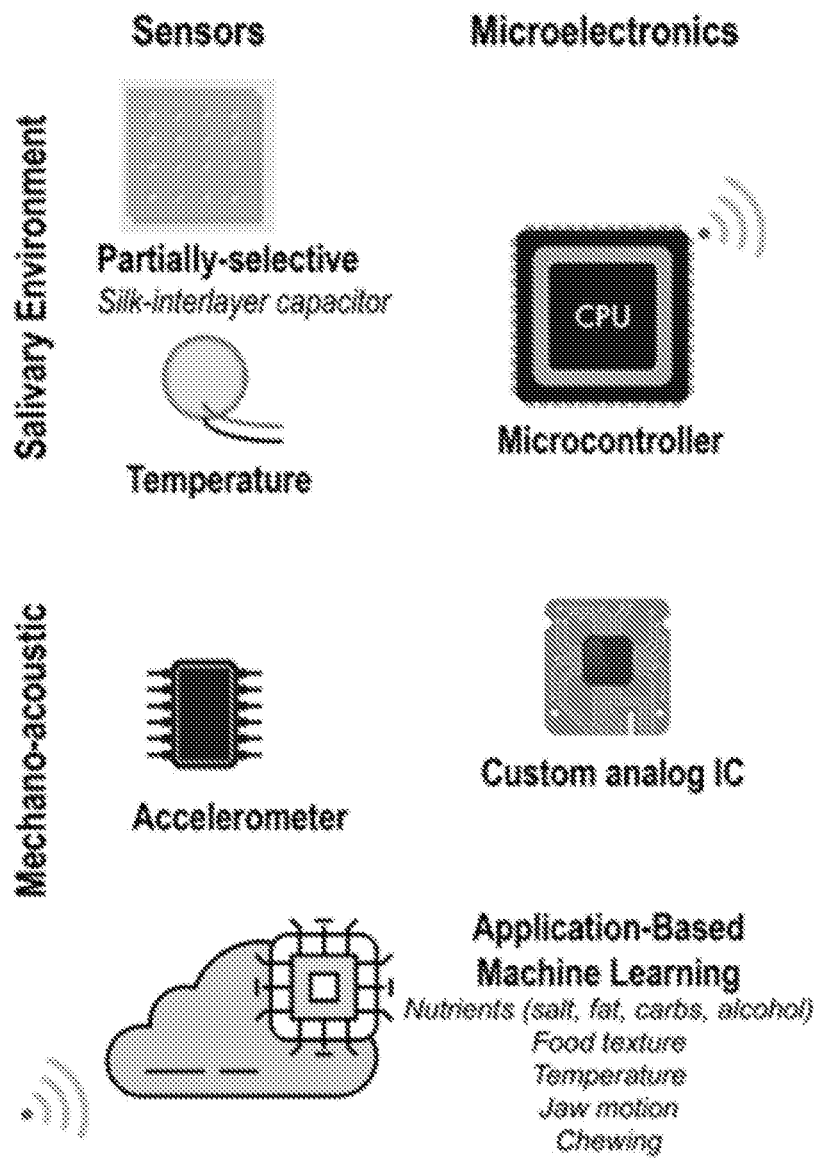
FIG. 4. Electronics of an integrated RFid tag for capturing patient diet. Analytical and temperature sensors are exposed to the environment of the mouth, while a mechano-acoustic sensor (detection of both motion and acoustic/sound signals) is encapsulated to protect it from the liquid environment. Sensor data is parsed using analog and digital circuits, and transmitted to an external device using wireless transmission. Various components have small form and specify minimal energy to power/read-out.

Another embodiment is implemented to draw passive, multi-modal data from a combination of analytical to physical sensor sub-types (FIG. 3), integrated into a single, compact RFid tag 300 (as an in-mouth module) which can quantitatively track nutrition and diet. Taken together, such sensors can capture multiple fundamental aspects of food consumed, including its underlying nutrients, temperature, and texture. These additionally capture information particular to a user, such as swallowing and chewing. Machine-learning fusion is performed on data from multiple (e.g., three) sensors: (I) Mechano-acoustic—jaw motion, food texture, and swallowing (e.g., an accelerometer included in a set of eating event sensors), (2) Temperature—food temperature, and (3) Partially-selective analytical—distinguishing nutrients from food itself. Such sensors can be built into a single, integrated, compact RFid tag that can be implanted in the mouth to continuously and wirelessly track personalized habits in diet and nutrition. Note that broadband accelerometers are capable of capturing both motion and sound. A functional, biometric data-focused system can be built around acquiring, storing, and analyzing biosensor data (FIG. 4). Such system can be implemented in a modular format, so that various sensor sub-types can be added or removed from the system to enhance the potential functionality of the system. For example, pressure sensors can be added to the system to obtain additional information on food density. Targeted analyte sensors (such as those detecting glucose or fructose) can be integrated into the platform to better co-measure specific nutrients within the saliva.

c. Impact

Modern medicine has grown increasingly reliant on pill-format interventions for disease. This dependence, coupled with an ever-increasing cost of these treatments, is placing significant burden on all layers of society—a cost that extends from the individual up to overseeing bodies. Unfortunately, such a strategy has done little to curb the onset of disease in populations, as diagnosed cases of diabetes, cancer, and inflammatory ailments continue to trend ever higher. An often cited solution to this is preventative strategies that seek to curtail disease through changes to lifestyle and habit. For example, through modifications to diet and nutrition, individuals can reduce the incidence of, and modulate the progression of various chronic illnesses. There is ever-mounting evidence at the biomolecular and mechanistic level that is pointing to the importance of when, how, and what nutrients people consume in preventative or maintenance strategies for both disease and bodily performance. For example, even the control of when food is consumed through a strategy of intermittent fasting has been implicated in the suppression of diabetes via a combination of mechanisms including autophagy and the reduction of insulin resistance (alongside post-prandial glucose). This link between nutrition and the behavior of the body underscores the significance of understanding, monitoring, and optimization of nutrition intake.

Embodiments are directed to a platform to quantitatively measure diet/nutrition, and incorporating versatile architectures capable of long-term, multi-modal biosensing. The improved approach leverages a fusion of physical data, biochemical data, and machine learning to create a better representation of the goal parameter of diet and nutrition.

In the long-term, such wearable platforms have relevance across numerous aspects; however in the short-term these devices are directly applicable to nutrition optimization. Development is proposed of quantitative tools for monitoring nutritional intake at the individual level and creating an objective, quantitative measure of nutrition. This would promote a culture of wellness at the individual level, and the information gathered by such devices can support a large number of additional nutritional studies, including the development of nutrition-based strategies to mitigate stressors, validation of nutrition strategies for performance enhancement, and the optimization of nutrition in different scenarios.

Investigation into the specific aims of some embodiments can generate numerous short-term to long-term benefits, including: (1) in the clinic, via investigating tools for nutritionists to better tracking participant intake, (2) in the home, as a method of users to track macronutrients for personalized health/medicine, and (3) in the lab, via support of bio-sensing technologies that can provide long-term biological read-out from implantable and wearable technologies. In the long-term, the platform can be integrated with additional biosensors to co-track pill or supplement ingestion, hormonal biomarkers (such as cortisol), and more. Such technologies can combine with other wearable devices (e.g., Fitbits and more) to better understand and optimize bodily response to diet and disease, and provide quantitative, closed loop information on the input-output response of the body.

d. Testing Data

Successful demonstration of implementations of each sensor class is made in-vivo on human subjects. These include an interlayer-RFid that can be utilized to detect certain nutrients from within the mouth, and a biocompatible strain gauge that operates within the working physiological motion ranges of the human body. In addition, initial studies are conducted on utilizing machine learning to fuse data from disparate sensor inputs along the throat, in-vivo.

d.1 Interlayer-RFid

Figure 5:
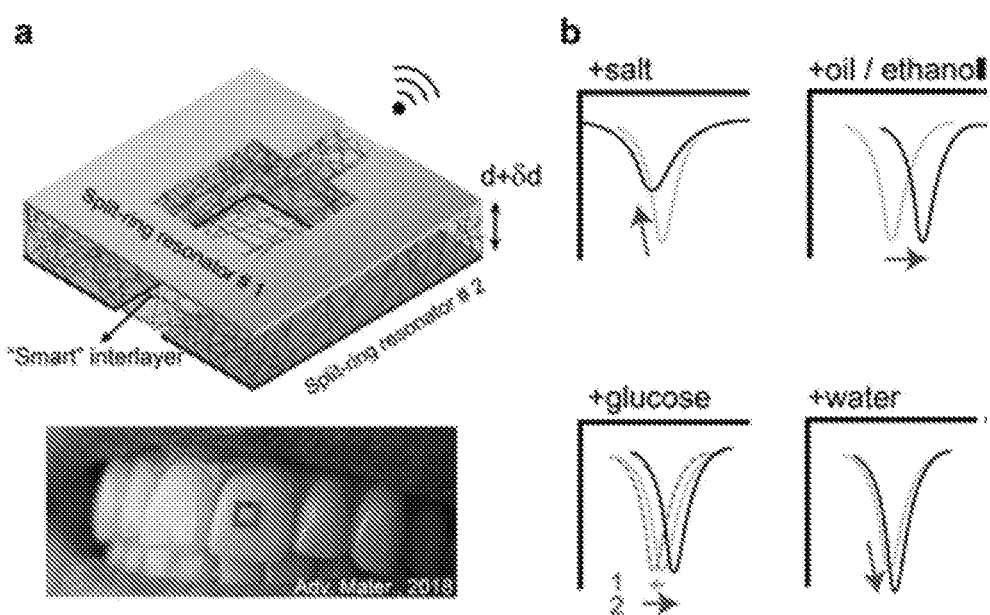
FIG. 5. Bio-interlayer-RFids. a) Trilayer sensor construct composed of split-ring resonators (SRRs) interceded by a "smart" interlayer. b) Resonant behavior of bio-interlayer-RFids to macronutrients of salt, oil/ethanol, water, and sugar.

An underlying technology for some embodiments is a bio-functional sensor termed an interlayer-RFid. Within the Testing Data here, a strategy to improve the biosensing characteristics of dielectric sensors is demonstrated by utilizing stacked and resonant-coupled split-ring resonators (SRRs) (FIG. 5, broadside-coupled SRRs). Of note, a functionalized "smart" interlayer that absorbs and swells in response to biomolecules intercedes these two split rings. Due to this structure, the sensor quality factor and resonant frequency are highly dependent on this interlayer material. Such a construct allows: (a) detection of changes in interlayer thickness, (b) temporal resonant behavior due to the interaction of biomolecules with the interlayer material, and (c) increased sensitivity due to the concentration of electric field through the interlayer. When this interlayer is composed of a biopolymer—in this case fibroin (a hygroscopic material that swells to variable thicknesses in different solutions), this structure displays unusual sensitivity to a variety of macronutrients. This construct is used to discriminate nutrients/foods such as glucose (apple juice), salt (soup), water, and alcohol (mouthwash) in-situ from within the mouth (FIG. 5).

d.1.1 Sensor Performance

Figure 6:
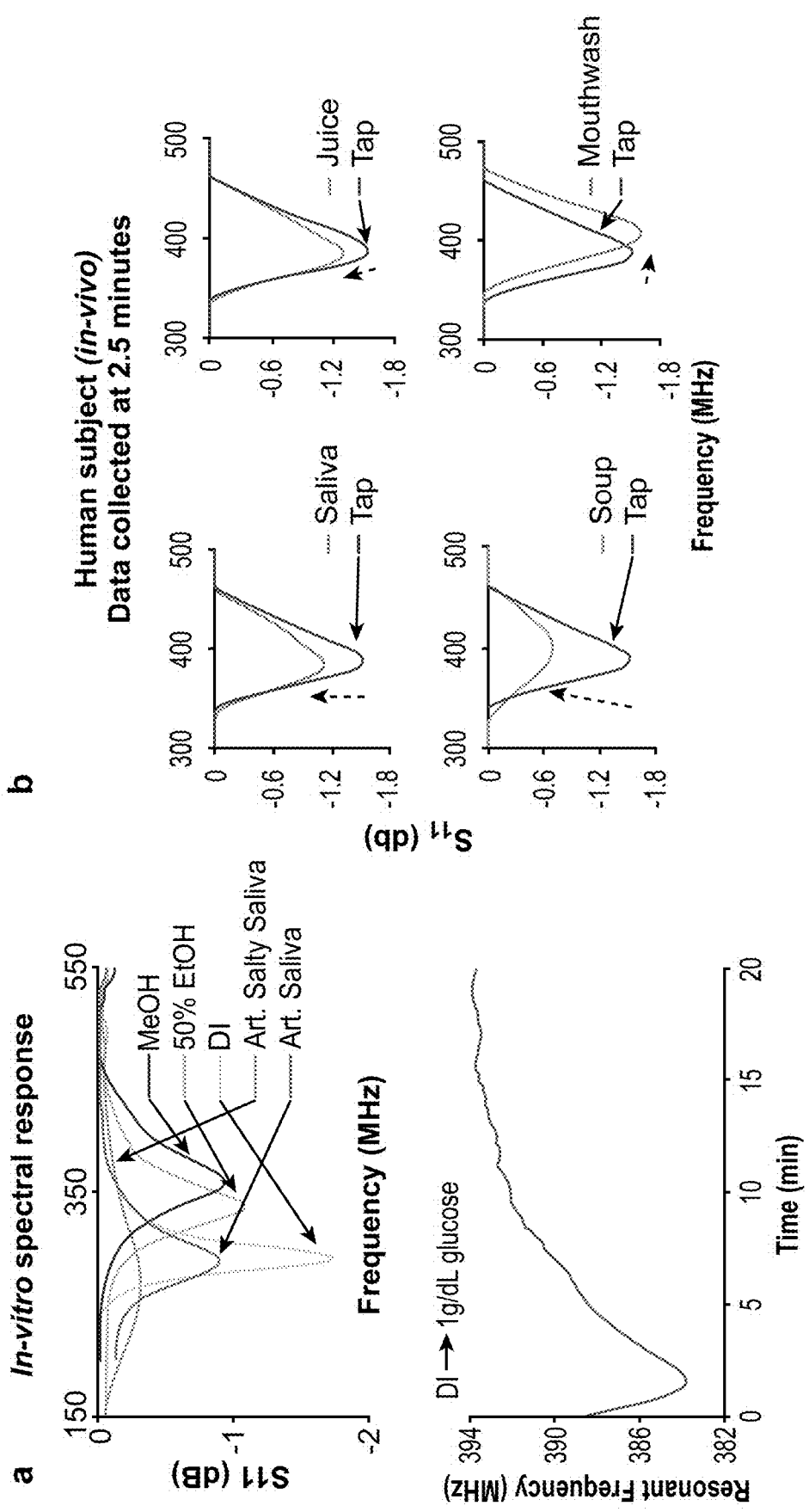
FIG. 6. Representative sensor behavior. a) Top: Spectral response of sensor to biofluids with varying alcohol, water, and ionic strength. Bottom: Temporal response of interlayer sensor to glucose. b) Discrimination of fluids with different nutrient content in-vivo and in-situ. Comparisons are against subject saliva.

Bio-interlayer-RFids display responses to nutrients that allow discrimination of intake. While other dielectric sensors exhibit constrained frequency behavior when switched from water to biofluids, this is not the case for the interlayer-RFid. This is because properties of the interlayer material (such as charge, hydrophilicity, or oleophilicity) exhibit interactions with biomolecules by swelling or squeezing in response (FIG. 6). Within the presence of salt, charged salt molecules penetrate the silk fibroin interlayer and act as shielding for the charged fibroin proteins. This results in the reduction of resonant frequency and reduced amplitude (due to more charged particles). In the presence of oil or alcohol, such molecules interact with the hydrophobic portion of silk fibroin to swell the construct. This leads to the increase in resonant frequency. With the addition of glucose, the sensor exhibits a temporal response—the resonant frequency reduces before increasing to its final value (above the initial resonant frequency). It is believed this is due to small molecule osmosis and initial rejection of the molecule by silk. With this behavior, saliva, fatty food, alcoholic drinks, sugary drinks, water, and salty foods exhibit distinct spectral responses (or signatures). While many foods exhibit a dominant nutrient characteristic (of salt, fat, sugar, and so forth), this sensor can distinguish combinations of foods. This can be partially seen in the in-vivo data of sensor response to soup (a combination of salt and fat).

Bio-interlayer-RFids exhibit sensitivities to the nutrients of real-world foods. In addition to the distinct spectral responses of the sensors to various nutrients, the sensors display concentration-dependent shifts in response to such biomolecules. The glucose sensitivity of a base trilayer construct is about 0.6 MHz per 1 g/L of glucose. This is well within the sensitivity specified for modern food products that possess exceptionally high sugar content. As an example, apple juice possesses a sugar concentration of about 200 g/L. The largest signal response occurs at 1× saline solution—this would be corresponding to a high salt-content drink. Notably, the sensor retains signal fidelity and sensitivity throughout this increase in salt. Typical dielectric sensors of this size would lose signal at this content of salt; however the interlayer material constrains penetrated salt, and thus the dielectric loss of the construct. The sensitivity to ethanol is within the detection sensitivity specified for alcohol drinks (about 12%) or mouthwash.

Figure 7:
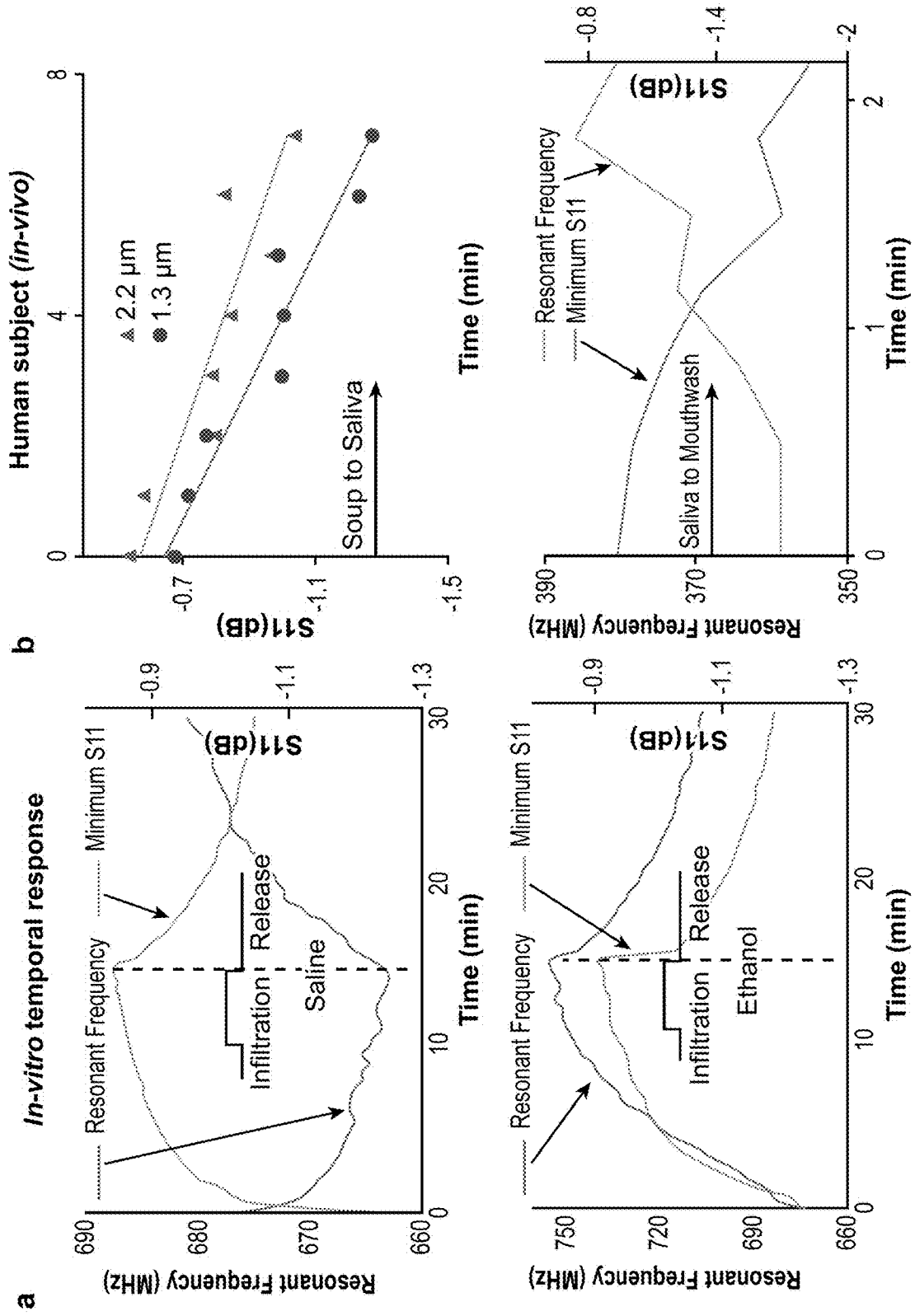
FIG. 7. Sensor response time. a) Temporal response in-vitro (room temperature (RT) and no agitation). b) Temporal response in-vivo, and in-situ (within the mouth).

Given that biomolecules penetrate the interlayer material, the sensors display a concentration-dependent temporal response to the presence of nutrients. Generally, it is found that at room temperature, sensors take about 15 minutes to plateau or saturate. Within about 3 minutes sensor response will hit close to about 70% of the final response. It is found that temporal shifts occur much faster in-vivo due to the higher temperature and great fluidic agitation. Initial shifts are noticeable within about 30 seconds to about 1 minute in-situ (and in-vivo, FIG. 7). Such sensors can track nutrients in both liquids (as demonstrated) and solid foods. The average person chews 10 to 20 times on a piece of food, and a single bite is in the mouth for about 20 to about 30 s. Flavors are reinforced and amplified during subsequent chews over the course of a meal (about 20 minutes). The tongue and human perception of nutrients give an estimate of desired device sensitivity for solid foods. When drinking a beverage, the flavor/sugar is perceptible in the mouth for minutes after drinking (at a similar taste to the drink itself). After chewing and eating a fatty piece of meat, fat or salt lingers between taking subsequent bites. Nutrients such as fat, salt, and sugar are naturally meant to extract and mix rapidly during chewing so that the tongue is able to taste the foods people are eating. Although the amount of dissolved nutrient is low, the volume of saliva lingering in the mouth is similarly low. Nutrients that remain after swallowing food do not disappear instantaneously but should be renormalized with fresh-produced saliva (this can take significant time).

d.1.2 Design Issues and Resolutions

Certain issues for the interlayer-RFid can be resolved with engineering development. These include sensor specificity and response time.

Figure 8:
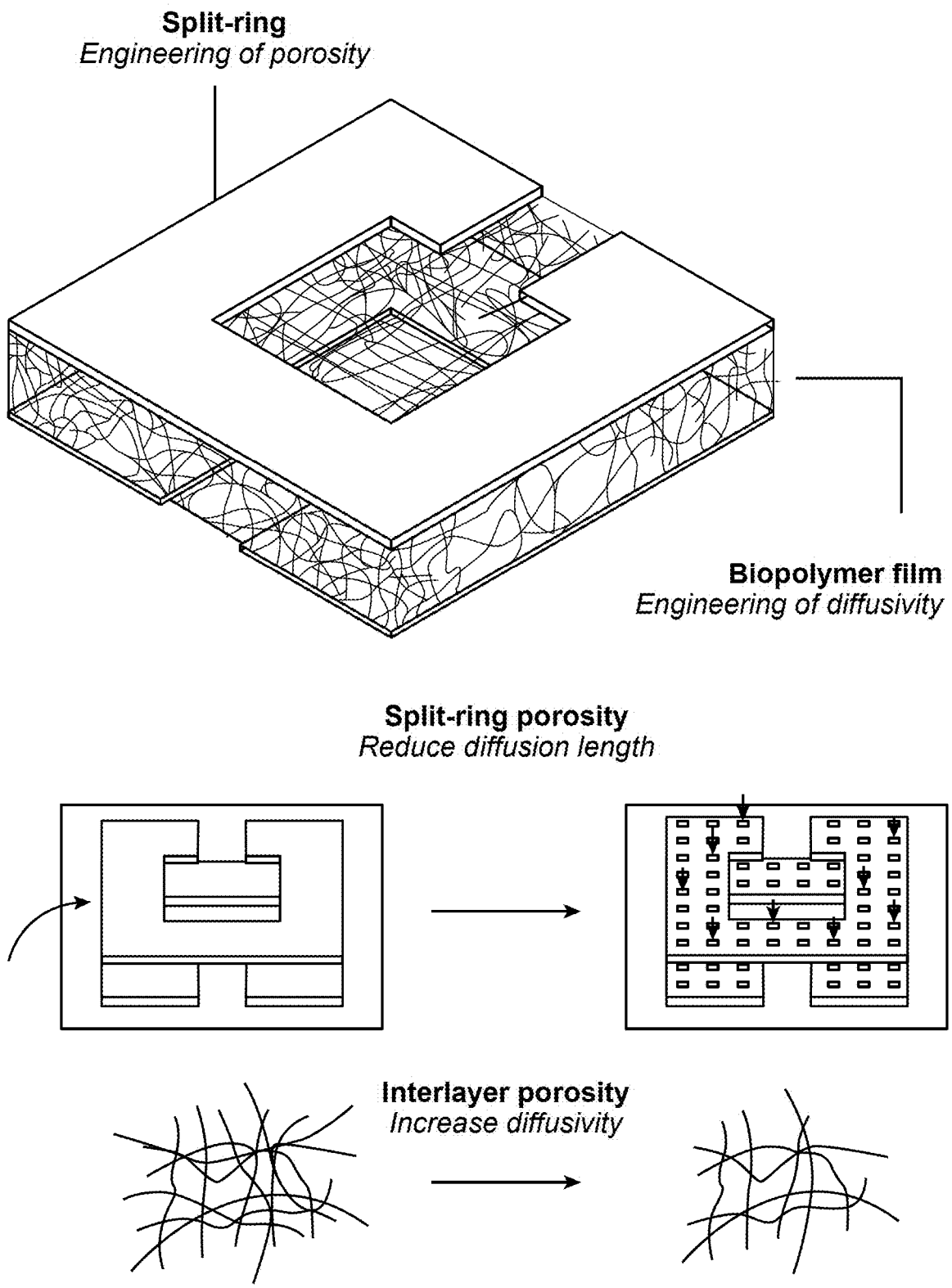
FIG. 8. Improving sensor response time and sensitivity. Sensor diffusion characteristics can be modulated via engineering of interlayer and split ring porosity.

Faster response time can be addressed via modulating a porosity of a conductive split-ring metal and/or the interlayer (as shown in FIG. 8). Such a strategy can reduce the diffusion length of the sensor by over an order of magnitude and reduce the response time of the sensor by several orders of magnitude.

Greater specificity/selectivity of the sensor can be addressed via several strategies, including utilizing sensor arraying and machine learning techniques to parse array data. A second strategy is to modify or switch the interlayer with materials that selectively absorb or swell in response to select nutrients. For example, various hydrophobic sponges can be fabricated that are oleophilic and hydrophobic. Such materials can selectively quantify and integrate the consumption of fats.

d.2 Large Gauge Factor, Biocompatible Strain Gauges.

Figure 9:
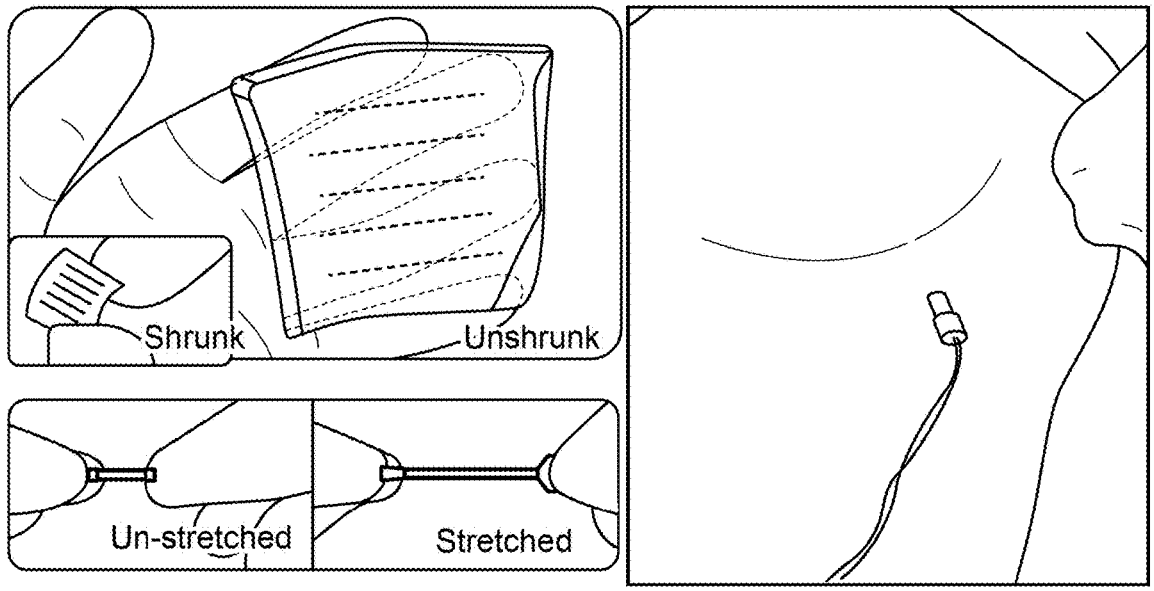
FIG. 9. Biocompatible, biosensing strain gauges. Sensors are composed of wrinkled platinum nano structures in a silicone rubber.
Figure 9:
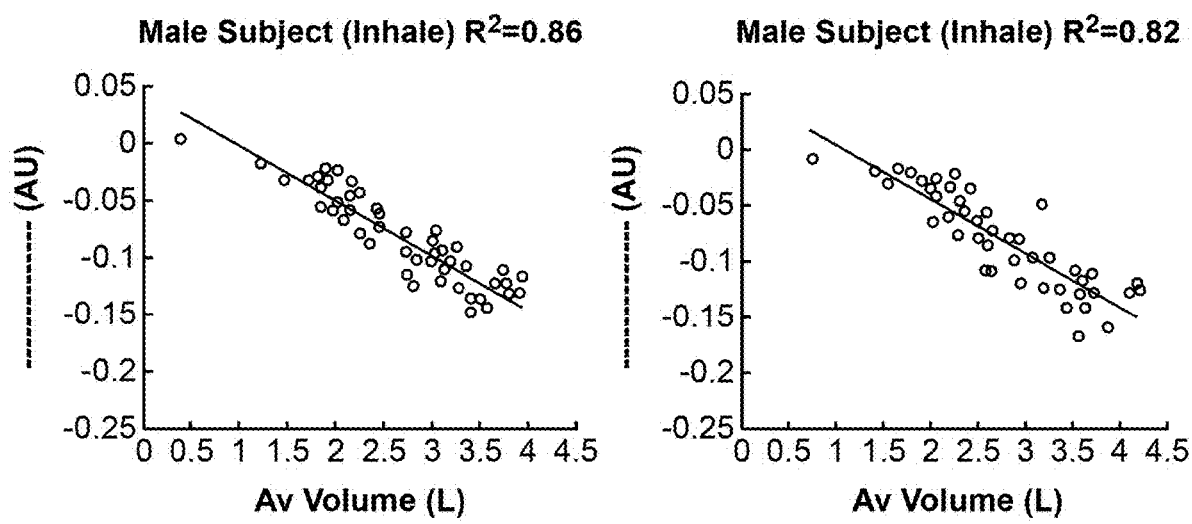

Another underlying technology of some embodiments is a biocompatible strain gauge that operates within the working physiological range of various motions of the human body (FIG. 9). Ultrasensitive, conformal piezo-resistive strain sensors are capable of measuring large mechanical strains of the chest during breathing. The sensors have a form factor of a disposable BandAid© and are attached to the subject similarly. The strain sensors are comprised of hierarchical wrinkled platinum (wPT) nanostructures embedded into skin-like silicone rubber. Over a large and physiologically relevant range, these wPT sensors achieve a high sensitivity among metal thin film strain sensors. In comparison to other strain gauges, the wPT strain gauges conform and stretch sufficiently to monitor large physiological movements.

d.2.1 In-Vivo Tracking of Respiration

Figure 10:
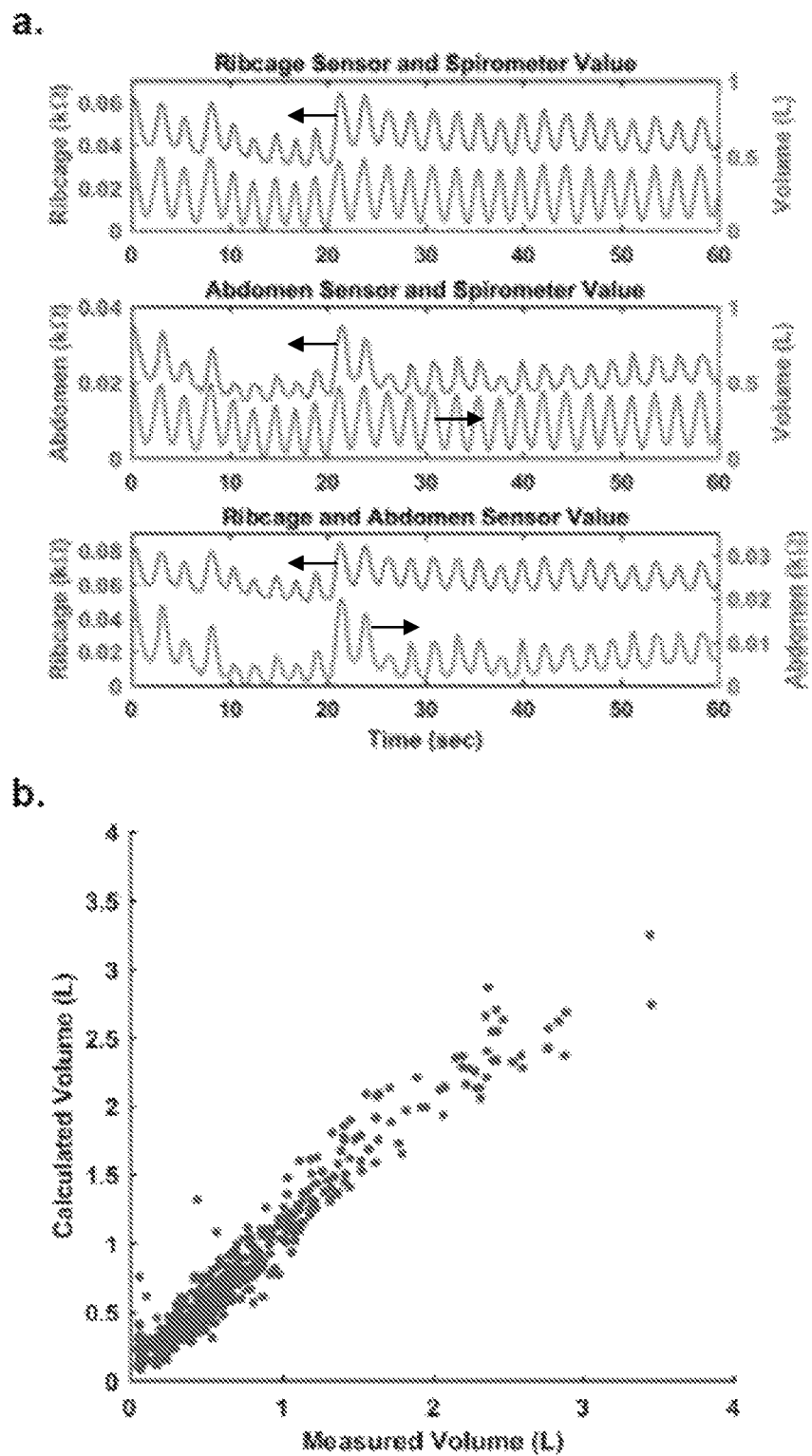
FIG. 10. (a) De-trended time series signal from the ribcage graphed with the respiration volume (top), abdomen graphed with respiration volume (middle), and ribcage graphed with abdomen (bottom). (b) Scatterplot of the calculated volume plotted against the actual volume for all subjects. The concordance correlation coefficient is about 0.962.

The sensors are developed into respiration sensors. In-human/early feasibility trial is conducted, which successfully correlated data obtained from the respiration sensors to the gold standard: a medical-grade spirometer (CareFusion, Yorba Linda, CA). Importantly, these preliminary studies demonstrate a high correlation with respiratory rates, as well as respiratory volumes compared to continuous measurements from the spirometer (FIG. 10a). The respiration sensors are first applied to the abdomen and ribcage to measure the change in strain at their respective locations. The breath-by-breath resistance change of the sensors are then linearized using a power model before being fitted to a multiple linear regression model. Across a pilot cohort of 7 subjects, the multiple linear regression model (MRL) provided an excellent fit with adjusted $R^2$ values ranging from about 0.92-0.97 across all subjects. While 2 sensors are used for this study, the fit was still very good ($R^2$ values range from about 0.83-0.95) when using just the ribcage sensor data. Moreover, when the MRL model was applied to calculate respiration volume in a subsequent test set, the sensors showed excellent predictability with a Lin's concordance correlation coefficient of about 0.962 for all the subjects combined (FIG. 10b). Volume is calculated accurately, under stationary conditions, as compared to the standard. The sensors also accurately measured different respiration rates compared to the measured rates from the spirometer.

With respect to sensor fabrication and manufacturability, processes are developed to scale manufacturing and reduce per unit cost. The sensors are characterized and demonstrated to be linear and robust, with cyclic fatigue testing of over 15 thousand of cycles.

d.2.2 Joint Sensor

Figure 11:
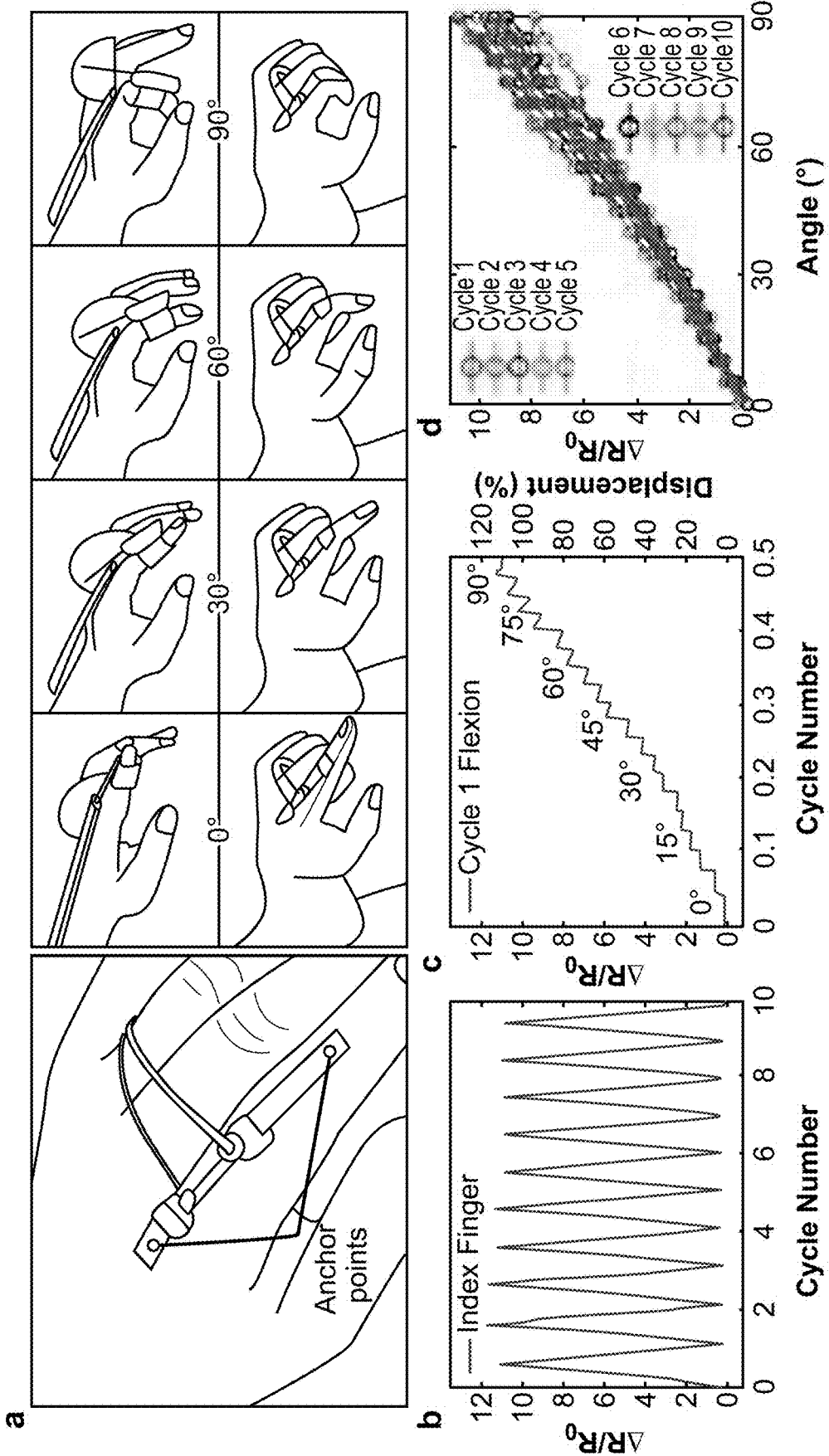
FIG. 11. (a) Distal and proximal anchor experimental setup with the sensor positioned between the proximal interphalangeal (PIP) and knuckle joints of the index finger. (b) Semi-static signal acquisition of the sensor stretching from 0-90° at 5° increments. (c) Subset of data showing the joint angle increases linearly with sensor displacement and changes in resistance. (d) Averages of the incremental data relative to respective joint angle shows the precision between cycles and good compatibility of the sensors for motion sensing and control applications.

The sensors are mounted onto the index finger to measure joint angles of the proximal interphalangeal (PIP) joint. Using an anchor setup, the sensor is positioned between the PIP and knuckle joints (FIG. 11). The distal anchor was located between the distal interphalangeal (DIP) and PIP joints while the proximal anchor was located between the PIP and knuckle joints (but closer to the knuckle). The anchor is comprised of an FDA-approved double-sided skin adhesive on a non-stretchable but flexible thin substrate. The flexible substrate is positioned over the PIP joint to absorb the bending strain from finger flexion and decouple the bending and strain of finger flexion, allowing the sensor to selectively measure planar displacement. Using a finger goniometer for verification, the finger was flexed and extended from 0-90-0° at 5° (±1° for human error) increments. Ten cycles of flexion and extension are recorded and normalized with each increment lasting for about 5 sec. The maximum observed linear displacement is about 113%. Each of these about 5 sec periods are averaged and plotted against their respective joint angle value. The sensor data exhibited high signal-to-noise ratio with clear differentiation between each 5° incremental step (see FIG. 11 data subset) and is found to respond linearly and precisely to changing PIP joint angles. Notably, this resolution is significantly better than other methods of finger joint angle tracking.

d.3 Neck Module

Figure 12:
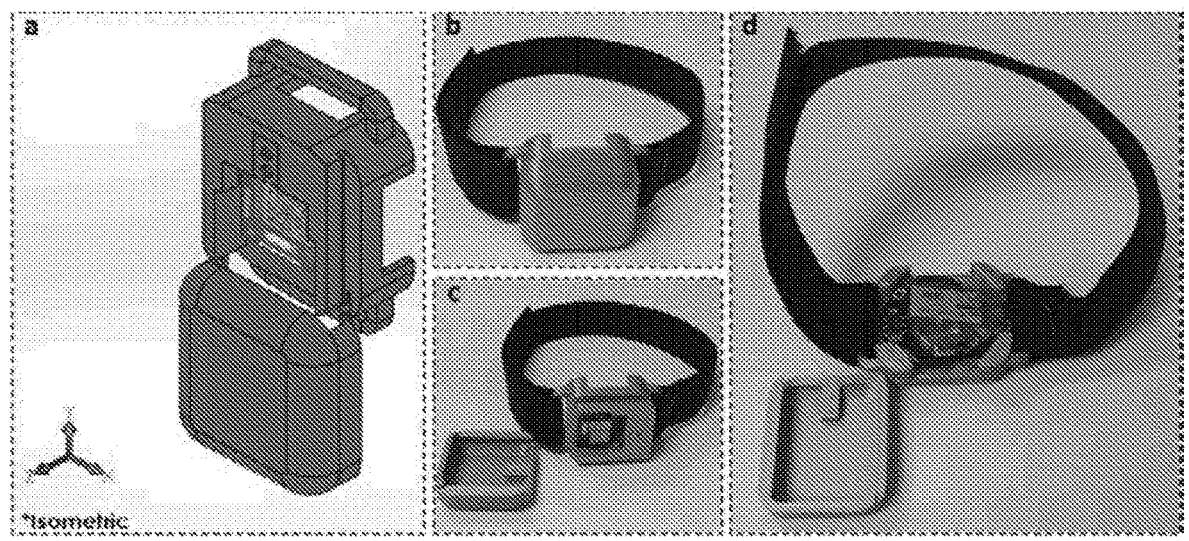
FIG. 12. Neck module prototype.

In some embodiments, the neck module includes a piezoelectric sensor, an acoustic sensor, and the strain gauge sensor all connected to a microcontroller board including a microcontroller (including a processor and an associated memory storing processor-executable instructions) and a wireless communication unit. An initial prototype of the neck module is designed in solid works and printed using 3-D printers. FIG. 12 shows the initial prototype. Following are the details of each of the components:

Piezoelectric Sensor: The sensor (LDT0-028K) boasts a sensitivity of about 50 mV/g to about 800 mV/g. This sensitivity is sizable enough to detect even relatively small perturbations without amplification.

Acoustic Sensor: The sensor (CEM-C9745JAD462P2.54R) is an electret microphone. Its operating voltage range of about 1.0 Vdc to about 10.0 Vdc allows for the sensor to be powered in parallel with the microcontroller using a CR 2032-coin cell battery.

Microcontroller Unit (MCU): RFduino is a microcontroller board that utilizes the RFD22301 MCU. The RFduino is capable of Bluetooth Low Energy (BLE) communication without extraneous RF modules. This device also has the capability of setting up a communication network between a master RFduino and up to 7 slave RFduinos—a network available from Nordic Semiconductor entitled Gazell (GZLL). RFduino is Arduino integrated development environment (IDE) compatible and the libraries for BLE and GZLL are open sourced. In practice, analog voltages can be sampled at predetermined general-purpose input/output (GPIO) pins and after the 0-3.3 V analog readings are converted to discrete values between 0-1023 inclusive.

d.4 Embedded Systems

Figure 13:
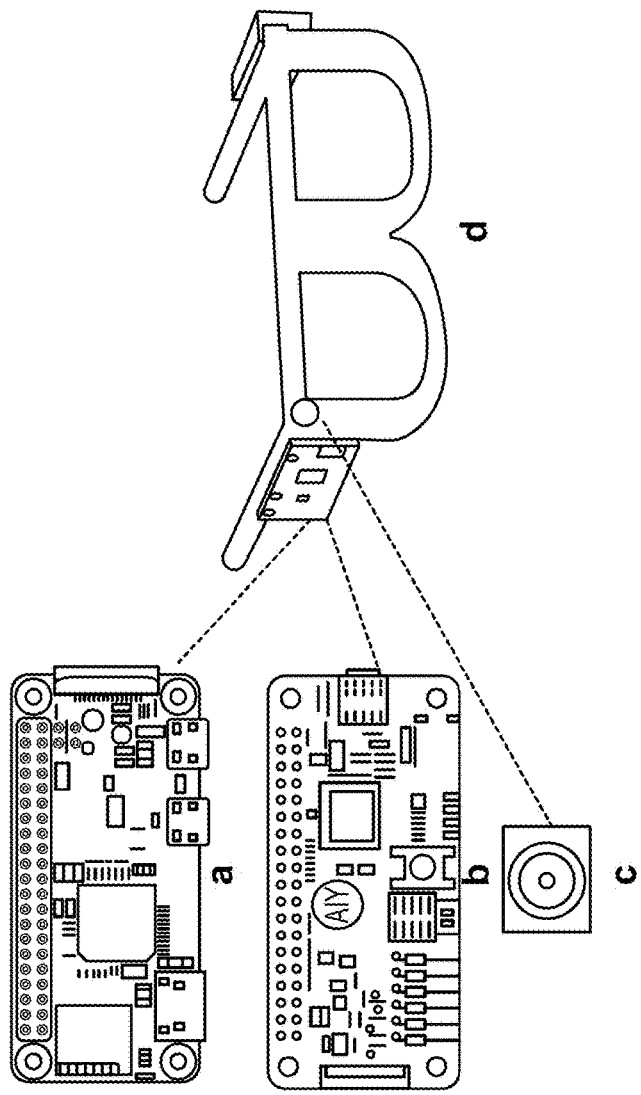
FIG. 13. Image analysis and recognition. (a) ARM-based microcontroller, (b) tensor processing unit and (c) integrated central node with smart glasses.

A machine learning-based image recognition software is developed for running in a central node. The central node includes a) an ARM-based microcontroller, b) a tensor processing unit (TPU), and c) a smart glass with a built-in camera and a battery as shown in FIG. 13. As a demonstration of the working capabilities of these systems, implementation is made of image processing/analysis capabilities. The image analysis is divided into food category analysis and food volumetric analysis in parallel.

First, the image from the camera is categorized into one of 101 pre-trained foods through MobileNetV1, which is an efficient convolutional neural network (CNN) model for platforms such as mobile and embedded vision systems. To maximize image classification performance and overcome performance constraints in mobile platforms, this prototype utilizes a TPU accelerator. Unlike a microprocessor with vector extension, which can perform constrained general-purpose operations, the TPU can perform millions of special-purpose operations in a single cycle, showing 83× performance per watt compared to the microprocessor.

Figure 14:
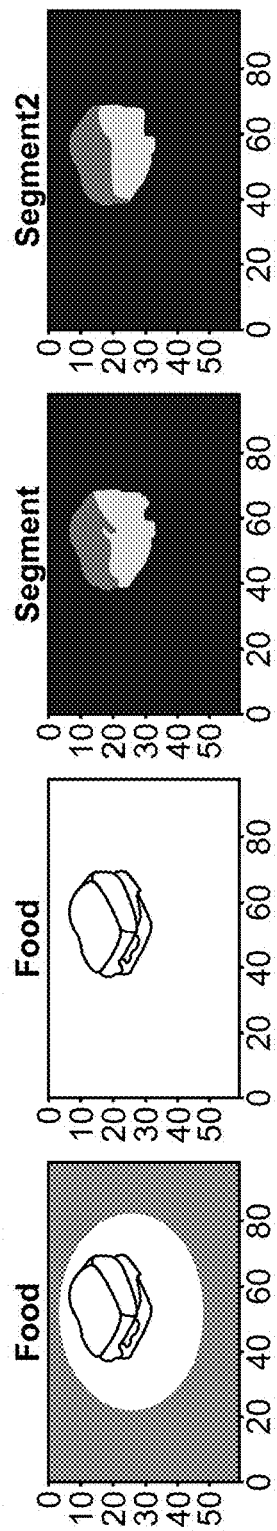
FIG. 14. Volumetric analysis with image processing.

Second, volumetric analysis for the image is performed through the following procedure. The image processing procedure is applied to divide the segment of the image first. The procedure is k-means cluster, using the R, G, B colors and X, Y positions (total 5 numbers) as the features for cluster. Plates of pre-measured sizes are used, and the height and area of the food is calculated based on the shape of the six predetermined foods such as hexahedral, cylindrical, conical, flat, spherical, and irregular shape. As an example, FIG. 14 shows the segmentation result of the morning sandwich and shows the process of obtaining the volume of food through the procedure.

d.5 Machine Learning

Machine learning procedures are used to detect various eating events as well as classify foods based on the collected data from various sensor modalities. As part of a preliminary study, 3 sensors are used (piezoelectric, acoustic, and strain) to collect data from 5 subjects to classify among 5 activities—i) Talking, ii) Mouth opening, iii) Chewing, iv) Swallowing, and v) Others. Here are the stages followed:

Data Collection and Labeling: A significant stage to train a machine learning procedure is accurate data collection and labeling. A data collection interface is developed that shows the collected data in real time. It also allows labeling the data while collecting that helps in the training phase.

Data Processing: As data is collected from real subjects in an in-vivo set up, the data is quite noisy. To filter out the noises, a sliding window mechanism is used. Sliding window takes the mean or standard deviation of all the data points within the window and puts the value in the middle index of that window. In this way, the data collected is processed from each modality. In this implementation, a sliding window of 33 is used.

Feature Extraction and Fusion: Once the data is processed, next extraction is made of the time domain features from the data. For this implementation, mean and standard deviation are used as features for each of the collected signals from the 3 modalities. Then all the features are fused from each signal and fed to various machine learning procedures.

Procedures: Implementation is made of 6 state-of-the-art machine learning procedures—AdaBoost, Decision Trees, Naïve Bayes, Nearest Neighbors, Random Forest, and Support Vector Machine (SVM). K-fold cross validation method is used to train the procedures. The value of K is 50 for all procedures except the SVM which is 3. In addition to the cross validation method mode filter is used to improve the accuracy. After getting the predicted results from the machine learning procedures, the mode filter is used for eliminating the noises and improving the performance of the estimator. The filter is based on a sliding window of length 51. In each window, the mode of the labels are calculated and set as the value of the center of the window. Table 1 shows the accuracy of different procedures in classifying the 5 activities. It can be seen from the table that Random Forest procedure performs better compared to any other procedures. The performance of the procedures can improve if more features are evaluated to train the procedures. Also tuning different parameters like sliding window size, the value of K in cross validation—can lead to improved results.

TABLE 1

Accuracy of various procedures.

| Algorithm | Accuracy |
| --- | --- |
| Random Forest | 76.64% |
| K Nearest Neighbor | 68.82% |
| Decision Trees | 69.29% |
| Naïve Bayes | 55.26% |
| AdaBoost | 59.09% |
| SVM | 23.16% |

Figure 15:
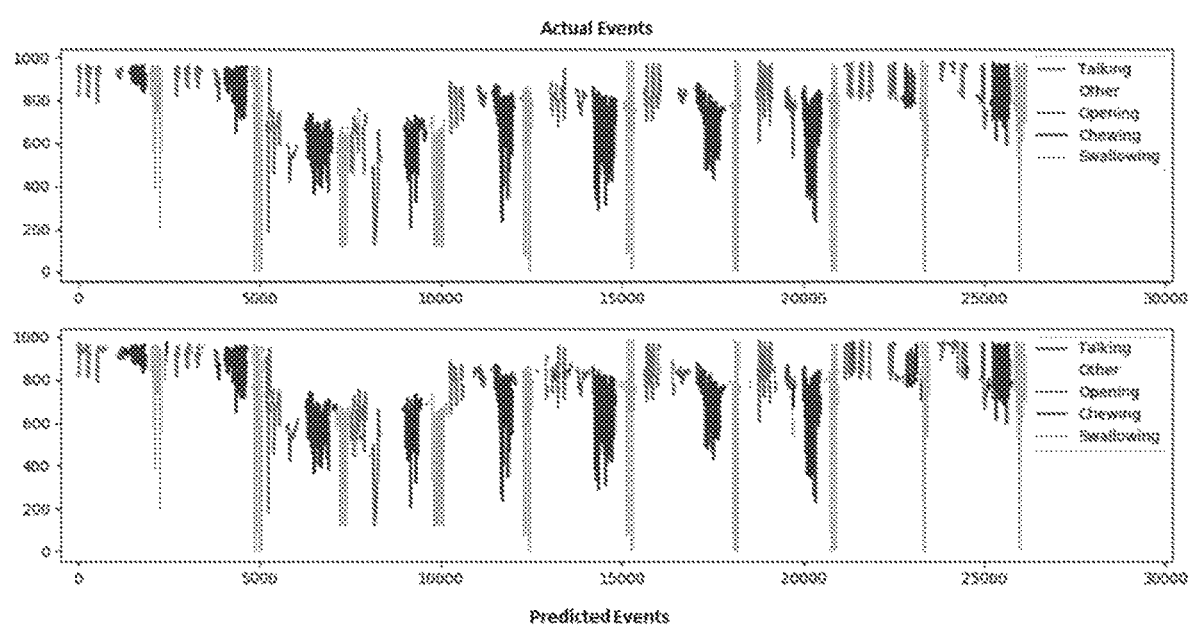
FIG. 15. Actual events vs. predicted events in piezoelectric data.

Event Detection: The ultimate output of the machine learning procedure will be different eating events predicted from the collected data. FIG. 15 shows the actual eating events against the predicted events using Random Forest procedure for the piezoelectric data subset.

e. Development

Figure 16:
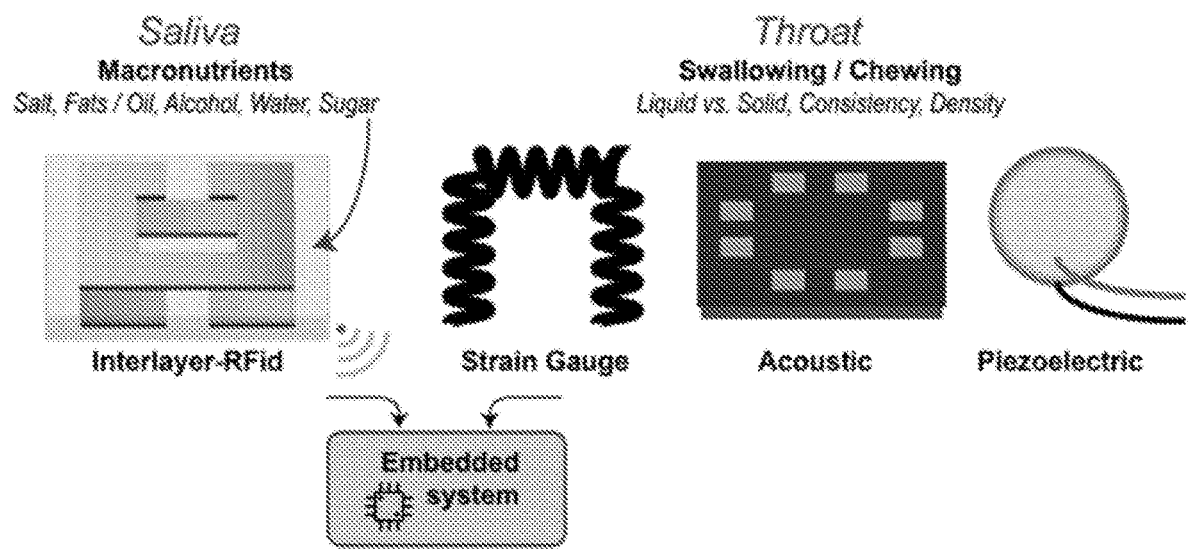
FIG. 16. Various sensors in a wearable, bio-IoT.
Figure 17:
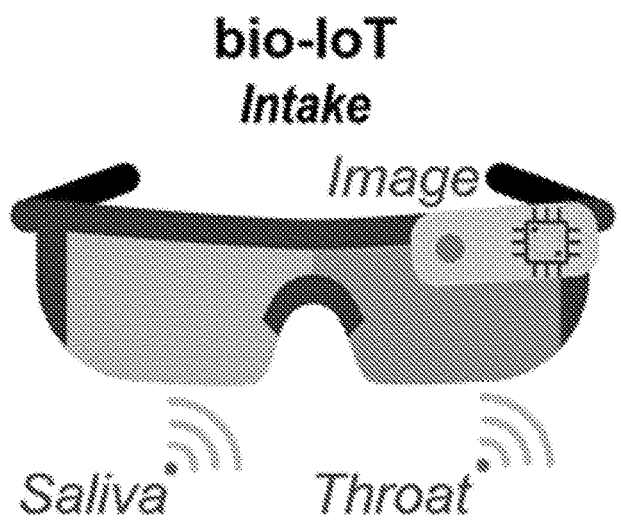
FIG. 17. Smart glasses as an extended central node for a Bio-IoT. Images captured here forms an additional input to a system.

Prototype development can be made, and validation of sensor modules can be performed either in-vitro or in-vivo. A base embodiment of the wearable platform can be composed of two modules: an in-mouth module composed of a compact, edible device to track and broadcast nutrient data from within the mouth (FIG. 16); and a neck module composed of a flexible analog read-out device tagged to the throat to track muscle motion and swallowing (FIG. 16). A central processing node can be integrated either within the neck module or into an extended embodiment of smart glasses (FIG. 17) that can double as image capture (for feedback) and the nexus of electronics for the embedded system. Data can be transmitted from and to this node via BluetoothLE. Motion from the jaw and throat maps broadly to food density and texture, while salivary data maps to nutrients. In effect, a fusion of sensor data is proposed that will each partially capture the nutrients, density, and texture of food (in addition to an individual's distinct response to a food)—this biometric data can be analyzed in combination with machine learning.

e1. Biosensor Development and Validation

Synthesis and development of interlayer-RFid biosensors with improved selectivity/specificity and structural stability. While base interlayer-RFid bio sensors can perform sufficiently for the wearable platform proposed herein, these sensors can be further improved in their ability to categorize nutrients. Development on the interlayer-RFids can be made to improve their ability to categorize and identify nutrients.

A sensor (based on silk fibroin) is able to cleanly identify single nutrients (fat/alcohol, water, glucose, and salt); however, categorizing complex combinations of nutrients may present some challenges. As noted in testing data, there are several solutions to this issue including the creation of sensor arrays, the integration of machine learning, and the development of improved interlayer materials.

Figure 18:
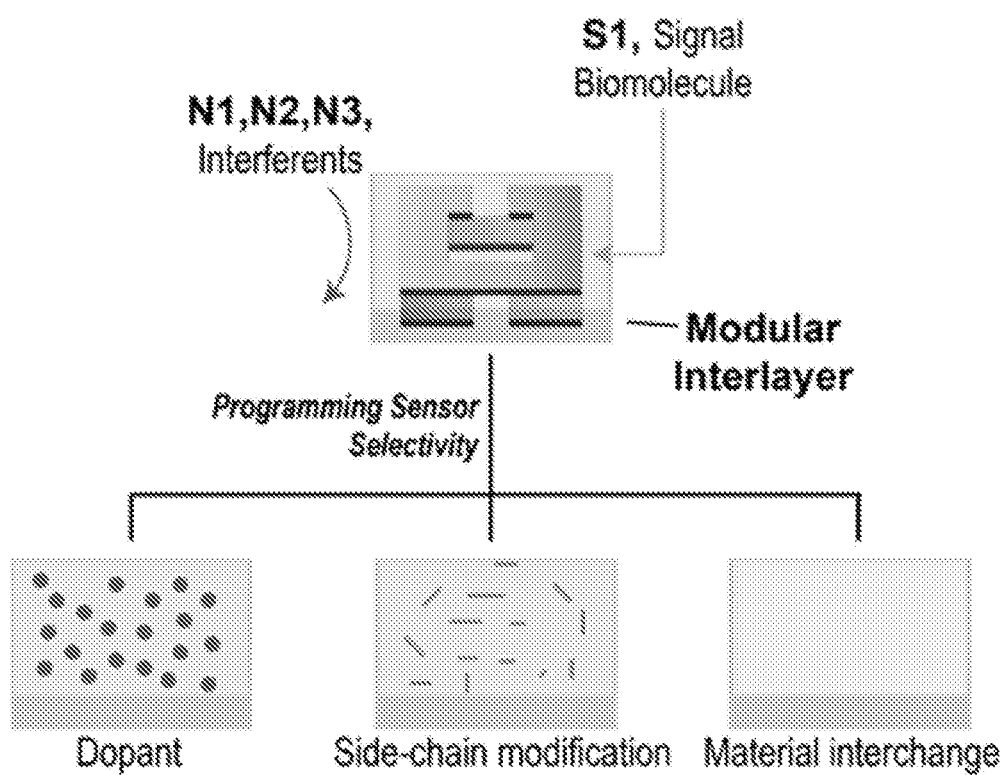
FIG. 18. Selective interlayer-RFids. Mechanism of action. Different interlayer materials possess tunable rejection or acceptance of nutrients. This can be modulated via modulation of interlayer material or switching to different interlayer materials.

This section will focus on the development of improved materials to integrate as the interlayer of interlayer-RFids to enhance nutrient selectivity (FIG. 18). This can occur via first mixing in dopant materials with different surface properties, and secondly direct modification of side-chains on a fibroin interlayer. Investigation can be made into selectively-absorbing interlayers. This can primarily focus around oleophilic/water-rejection interlayers. Preliminary investigations can focus on modifying commercially available oil-absorbent sheets (Uline, Light sorbent pads); however, hydrophobic aerogels can be directly synthesized that can be sized and shaped to design specifications. These sensors can be useful in the scope of nutrient sensing due to their permanent absorption and integration of fats.

Interlayer bulk properties can be modified via mixing of alternative insoluble biopolymers. Tests can be performed on chitosan and gelatin that possess different isoelectric point (pI), hydrophilicity, and oleophilicity than silk. Additionally, investigation can be made on approaches to directly modify silk fibroin side-chains. Investigation can be made on glutaraldehyde and diazonium reactions to bind various side-chains to silk, include hydrophobic, charged, and hydrophilic groups. Such modifications can change the selectivity of the interlayer material.

The behavior of synthesized interlayer-RFids can be characterized for response to mixtures of nutrients dissolved in artificial saliva including salt, various fats, alcohol, and glucose. Spectral response can be verified using a bench-top network analyzer.

Objectives Include:
  Synthesis of biopolymer-doped interlayer-RFids.
  Synthesis of side-chain modified fibroin-interlayer-RFids.
  Fabrication of fat-absorbing interlayer-RFids.
  Characterization of selective interlayer-RFids bio sensors.
  Optimization and process development of selective interlayer-RFid bio sensors.
  Flexible, multi-sensor printed circuit board (PCB) design and development. Practical usability and form factor are issues that can hamper wearable devices. At a base level, a 2-component system is proposed with two modules that can be tagged straightforwardly to the body (the throat and a tooth). The neck module should be low-weight and flexible, so as to be able to conform to the body while not impeding the motion of the jaw or throat. The multi-sensor neck module can be adapted to a flexible PCB in order to improve the module usability. Two formats of a flexible PCB board can be utilized. The first involves boards that can be custom-designed and synthesized, which can be made by masking and etching copper-polyimide-copper substrates. The second involves flexible PCBs with silk screens. In addition, this module can be designed to support the addition and subtraction of sensor sub-types. Demonstrated sensors include acoustic, piezoelectric, and strain gauge sub-types; however, additional sub-types (such as EMG sensor) can provide expanded biometric information, obviate other sensors, or reduce processing demands. This can include a "plug-and-play" board design to evaluate and implement the sensor fusion strategy. This type of design can be generated by fabricating sensor nodes that can be turned on or off as specified by the platform.

Objectives Include:
  Preliminary (base sensors and microcontroller) and advanced (including ARM-based SOC) design of flexible neck module PCB.
  Fabrication and pick-and-place of neck module electronics on flexible PCB.
  Plug-and-play biosensor design.
  In-vivo testing of flexible, low form-factor neck module.
  Size and weight optimization of neck module.
  Alternatives: While flexible PCBs may possess improved form factor, lower weight, and reduced user burden, mechanical flexing and movement by the user may produce noticeable noise in the system. Two solutions can address this issue: a first involving signal filtration and classification strategies to identify and remove noise induced via mechanical movement, and a second utilizing either a single connected stiff PCB board, or connected islands of stiff PCB sensor/filtration nodes.

e2. Electronics Design and Implementation

Base embedded system: Development of ARM SOC to monitor and catalog biosensor data. The ARM-based embedded system, which can be regarded as a central node, can wirelessly collect data from different sensors, and store them into a local relational database. Other microcontroller boards can be used that are similar in capabilities, and have similar architectures, input/output (I/O) interface, and run Linux-like operating systems. These can be programmed using tools available to system programmers such as compilers and debuggers.

For the sensors, collecting the sensor data can be implemented as a continuous collection, or can be programmed to occur with user input—such as a button press. Sensor data is retrieved via BluetoothLE in order, and timestamped for analytical techniques. A relational database, SQLite, is used as a local database for storing sensor values with partitioned relations (tables), and the database schema is suitably configured. An Event table stores each event such as sensor reading, taking picture, and corresponding time and detail. A SeriesofEvents table stores a series of events referring to the Events table, which is continuous or is initiated with user input. The Sensor table has a pre-defined sensor type. This data can either be stored in a local memory or transmitted to the cloud. This data can be processed in parts within this node or in the cloud as specified by the application.

Figure 19:
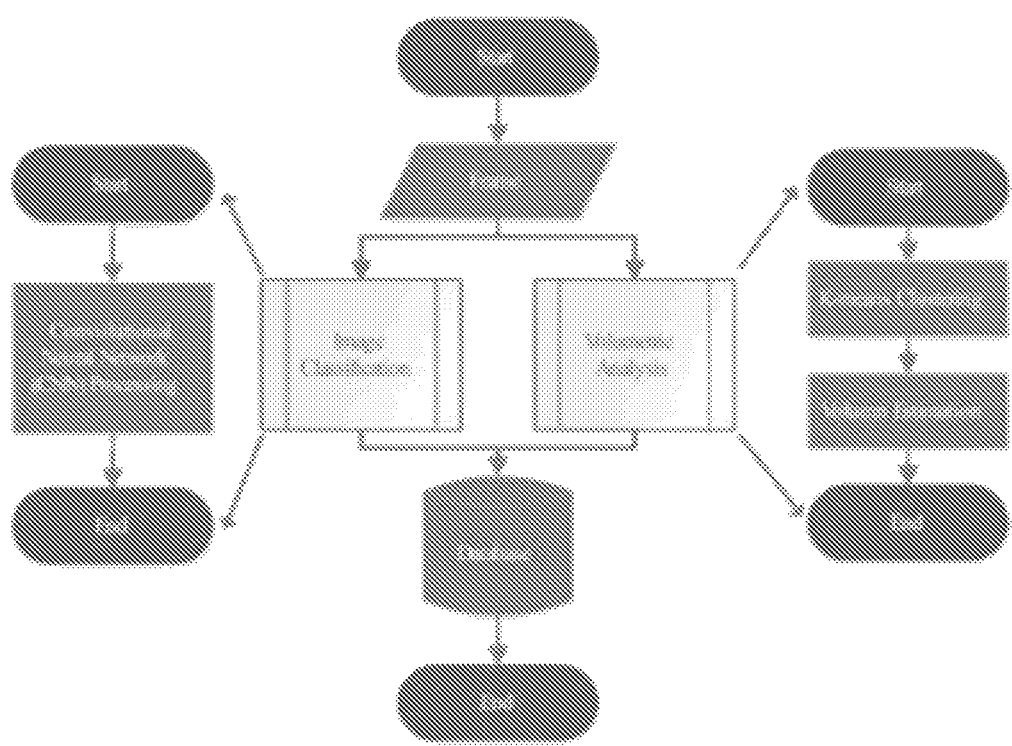
FIG. 19. An overview of integrated image classification and volumetric analysis.

Objectives Include:
  Development and encoding of an ARM-based small form factor board to store, catalog, and analyze biometric data.
  Development of a computing, communicating, and data processing architecture for optimization of memory, power, and accuracy of data analysis.
  Design and implementation within the neck module
  Extended embedded system: "Smart" glasses, central node capable of image processing and biosensor data processing. FIG. 19 shows a flow chart of an entire process of image analysis that can be implemented to run on an integrated smart glass platform. The food type and volume are stored as a single event and corresponding details in the local database described above.

Embedded systems such as the smart glass platform have particular specifications, including cost, size, area, and energy constraints, that may constrain accuracy of nutrition analysis when processing in-situ to meet real-time constraints, and improvement on such accuracy can be made while keeping energy efficiency high. Thus, a concern is to ensure that the smart glass system consumes low power while achieving high accuracy of nutrition analysis. To mitigate these conflicting challenges, consideration is made of modality scaling and virtualization, Modality scaling increases the accuracy of the analysis using additional sensors. Generally, added sensors consume much less power than adding a processing unit. For example, the accuracy of two images from two different angles instead of a single image analyzed can be much higher. Alternatively, or in conjunction, adding data from bio sensors and/or neck sensors can improve confidence in one candidate food classification versus others. This fusion of sensing modalities is further discussed below.

Objectives Include:
  Integration of image processing capabilities within sensor suite within ARM-based SOC.
  Development of an energy efficient, image-based food classification system.
  Integration of smart glasses into biometric data stream.

Alternatives: Virtualization is another way of improving accuracy. Currently, a TPU can process a small size convolutional neural network (CNN), which results in lower accuracy. In order to overcome such constraint, ways of partitioning the CNN into smaller components can be made so that the TPU can process one component at a time in a way transparent to the user. While such virtualization can increase the processing time, it can result in improved accuracy. This can be referred to as local virtualization. Remote virtualization works in a different way, tiering the computation such that a portion of the processing (sometimes referred to as lightweight processing) is done locally while another portion is done in the cloud. The advantage of this method is that the data being transmitted can sometimes be reduced, thereby reducing transmission energy and if properly partitioned, can result in smaller energy consumption compared to local virtualization.

Neck module: Design of analog and analog/digital (A/D) circuit microcontroller system. The electronics of the flexible neck module is adapted to control, filter, and amplify signals from various sensor sub-types. Broadly, this neck module is adapted to perform two primary tasks: (a) Extract, filter and amplify signals from acoustic, piezoelectric, and strain gauge sensors, and (b) Provide wireless power to the in-mouth, interlayer-RFid based module (attached to a tooth).

Signals extracted from throat biosensors can be prone to noise (particularly due to flexible substrates and perturbations introduced by human motion), and should be filtered to extract a biological response. The response of the resistive strain gauge can be extracted via a Wheatstone bridge circuit, whereby the voltage at the output of the strain gauge (in series with another resistor) is compared to the output across a constant comparator resistor (also in series with another resistor). This signal can be amplified and filtered using low footprint, analog op-amps (INA series, Texas Instruments). Breakout board designs for acoustic and piezoelectric sensors (included various filtration and amplification components) utilized in the Preliminary Data can be similarly translated to a custom PCB board design in order to be integrated onto flexible substrates. Biosensor data (composed of analog and digital signals) can then be fed into low footprint, ATtiny20 microcontrollers, which can transmit the data to the central, ARM SOC processing node via BluetoothLE.

The in-mouth module can be powered via near-field, inductive coupling originating from a source signal generated by the microcontroller or the ARM SOC. This signal can be fed through a power amplifier chip and finally a planar coil tuned to about 900 MHz. This signal can be turned on and off as specified to probe the sensor.

Objectives Include:
  Design of strain gauge read-out circuit (including Wheatstone bridge and analog filters).
  Simplification and adaptation of piezoelectric sensor break-out board design.
  Simplification and adaption of acoustic sensor break-out board design.
  Design and implementation of wireless power link between neck module and in-mouth module.

Figure 20:
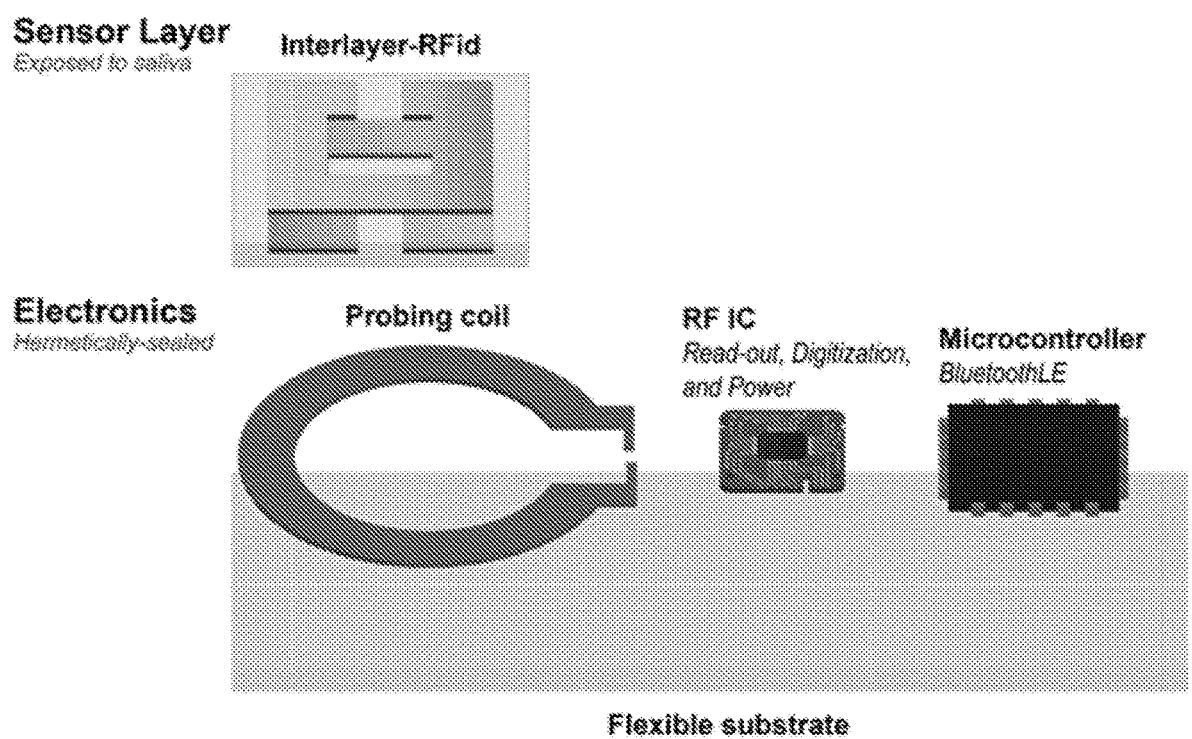
FIG. 20. Components of in-mouth module. Sensor layer is exposed to saliva. Electronics layer is hermetically-sealed in polymer (e.g., polyurethane) in order to isolate these components from the biological environment. This layer is composed of a probing coil, an RF integrated circuit (IC) that is powered by an inductive link, probes the interlayer-RFid behavior, and digitizes the data for transmission via Bluetooth.

In-mouth module: Fabrication of radio frequency (RF) power and read-out circuit for interlayer-RFid. Development is proposed of a low-form factor, wearable solution to read out data wirelessly from interlayer-RFid sensors. Structurally, this module is composed of two layers: (a) a mouth-environment exposed sensing layer composed of a biocompatible interlayer-RFid, and (b) a sealed read-out circuit that is remotely powered via near-field inductive powering (generated from the neck module). This module can contain minimal sealed electronics (a small RF integrated circuit (IC) chip), and can be biocompatible and edible while retaining a small enough footprint to fit on a tooth (FIG. 20). In additional embodiments, a set of eating event sensors (e.g., a mechano-acoustic sensor) and a temperature sensor are also included in the in-mouth module.

Electrochemical impedance spectroscopy (EIS) techniques based on precise capacitance measurements can be used for the read-out circuit. For example, a technique can be used to measure the dielectric constant of a material based on connecting the material under test in parallel with an LC tank used in a voltage-controlled oscillator (VCO), which is embedded in a phase-locked loop (PLL). By measuring the change in the PLL output frequency, the capacitance of the material can be measured. As another example, a sinusoidal voltage with frequency up to about 50 MHz is applied across the material under test; the resulting sinusoidal current is down-converted to direct current (dc) using a pair of mixers in quadrature. The resulting dc output voltages from the mixers thus give the real and imaginary parts of the admittance. A similar technique can be used, but with a high-frequency design. The sinusoidal current conducted in the material under test is applied to the input of a distributed low-noise amplifier (LNA) and then down-converted to an intermediate frequency of about 100 MHz.

Figure 21:
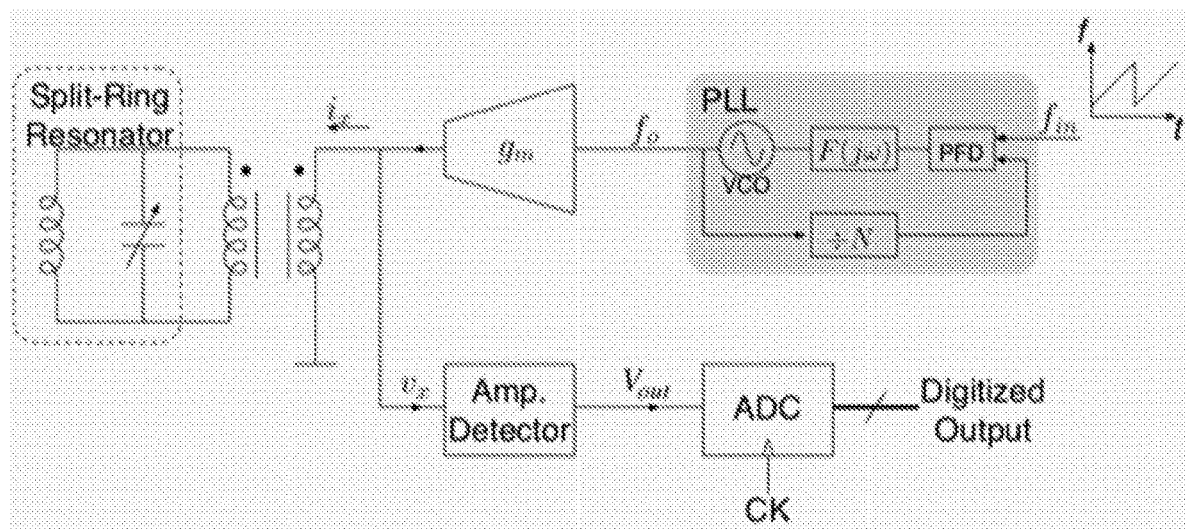
FIG. 21. Generalized electronic system for probing a resonant sensor. Block diagram of proposed impedance measurement circuit. A phase-locked loop (PLL) is used to generate the frequency of the sinusoidal current applied to the resonator. VCO, voltage-controlled oscillator; $F(j\omega)$, loop filter; PFD, phase/frequency detector; $\div N$, frequency divider.

An embodiment of the read-out circuit for directly measuring the magnitude of an impedance of a split-ring resonator is shown in FIG. 21. Input frequency $f_{in}$ is swept linearly over a certain time period and applied to the input of a phase-locked loop (PLL). The PLL output, a voltage with frequency $f_o = Nf_{in}$, is applied to the input of a transconductance block $g_m$, which provides a current $i_x$ with the same frequency that is magnetically coupled to the resonator. The resulting voltage $v_x$, which has an amplitude proportional to the magnitude of the resonator's impedance, is applied to an amplitude detector, which is then digitized by an analog-to digital converter (ADC). This digitized data is fed to a microcontroller for transmission to a central node. Other strategies wherein relevant data is transmitted within reflected backscatter generated by the in-mouth module can be considered.

Preliminary implementation can be via a PCB with chip RF components. Such components are available in small chip format. Further implementations of these circuits can be made on flexible PCB boards. Upon completion of prototype boards, the capability of such devices will be tested against both benchtop network analyzers and portable vector network analyzers (VNAs) (miniVNA brand) on bio-interlayer-RFids. The sensitivity and accuracy of the output resonant frequency and amplitude from the portable VNA and custom PCB can be compared against the benchmark results of the benchtop network analyzer. The goal is that the custom boards will possess similar accuracy with portable VNAs, and optimization of circuits can be made to achieve this goal (via noise reducing schemes, chip layout and component design, and more). Further, fabrication of these components into a custom-designed RF IC chip can be made.

Objectives Include:
 Design and implementation of the RF read-out circuit with available components (PLL, PFD, ADC, and amplitude detector).
 Benchtop validation of the read-out capabilities of implemented circuit.
 RF IC design, fabrication, and test loop.
 Integration with interlayer-RFid bio sensors, and benchtop validation of combined in-mouth module.

Alternatives: Design considerations include the ability to reduce power demands and reduce the input energy to power the in-mouth module. Resonant read-out of the sensor may prove less stable in a complex, moving environment of the mouth. Another strategy to read-out the sensor is direct capacitive readout of the permittivity of the interlayer. Such a strategy is more power hungry and slightly more cost ineffective than a resonant read-out; however, this strategy is likely more stable to mechanical movement.

e.3 Data Engineering and Machine Learning

Design of event detection method: detection of bodily actions from wearable sensors. For the detection of bodily actions, the 'Python' language can be used to implement various machine learning procedures. Machine learning procedures can be implemented in 'TensorFlow'. 'TensorFlow' is an open source Python-friendly library for faster and easier numerical computation of machine learning procedures. Another reason for choosing Python language for the implementation of the event detection framework is that it can be deployed to the proposed ARM-based SoC. The ARM-based SoC is adapted to perform local data processing and is portable.

Details on the data engineering and machine learning framework are given below. The process of detecting the events can broadly be classified into 2 parts—(1) Clustering of input data, and (2) Event detection.

Figure 22:
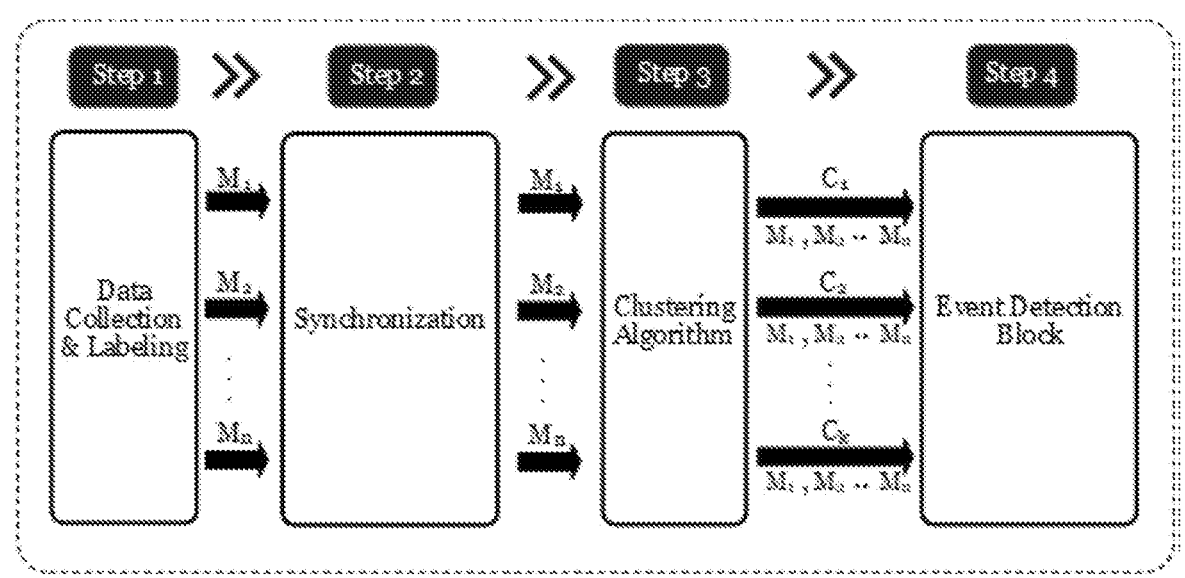
FIG. 22. Stepwise procedure for input data clustering.
Figure 23:
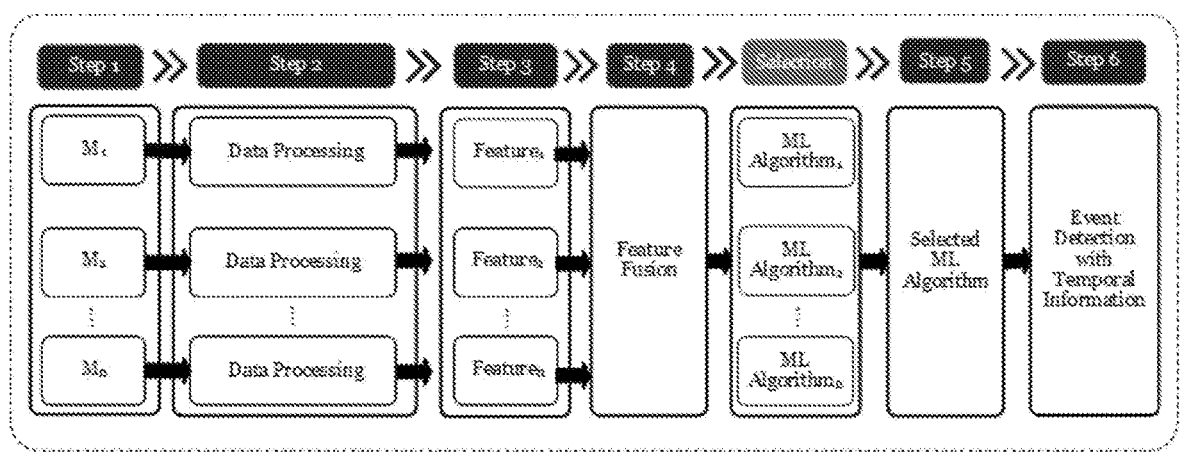
FIG. 23. Stepwise procedure for event detection.

Clustering of input data: To develop a robust food intake monitoring system, various modalities are used to collect data from multiple individuals belonging to different classes of age, gender, and ethnicity. Different individuals will have different eating behavior like chewing frequency or swallowing rate. Processing this disparate classes of data can be troublesome and the event detection may be less accurate. Thus, it is desirable to cluster data before processing for event detection. If data is clustered based on the class variation, insight can be gained of the eating behavior and food habits of a particular class of people. This will also allow developing a class-specific robust food intake monitoring system with higher accuracy. FIG. 22 shows a stepwise procedure to cluster data before event detection. The first stage involves the collection and labelling of data from different individuals using various state-of-the-art modalities. The second stage is dedicated to the synchronization of data. The third stage can be to apply clustering procedures to cluster the data collected from various individuals (for example, this can be individuals of a particular age or gender). In the fourth stage, data corresponding to individuals in a particular cluster can be sent to the 'Event Detection Block' (FIG. 23).

The final output of this block is the detection of eating activities along with their temporal information. This block can extract and fuse features from gathered data to be fed into the machine learning procedures, such as AdaBoost, Random Forest Classifier, Naïve Bias Classifier, Nearest Neighbors, Support Vector Machine, Decision Trees, and so forth. Deep Neural Network and Reinforcement learning also can be used.

Objectives Include:
 Implementation and development of stepwise procedure for input data clustering.
 Collection and supervised labelling of multi-sensor, training data using wired sensors (strain gauge, piezoelectric, and acoustic) during facial actions.
 Collection and supervised labelling of multi-sensor, training data from wireless neck module.
 Training of machine learning procedures on collected data.

Figure 24:
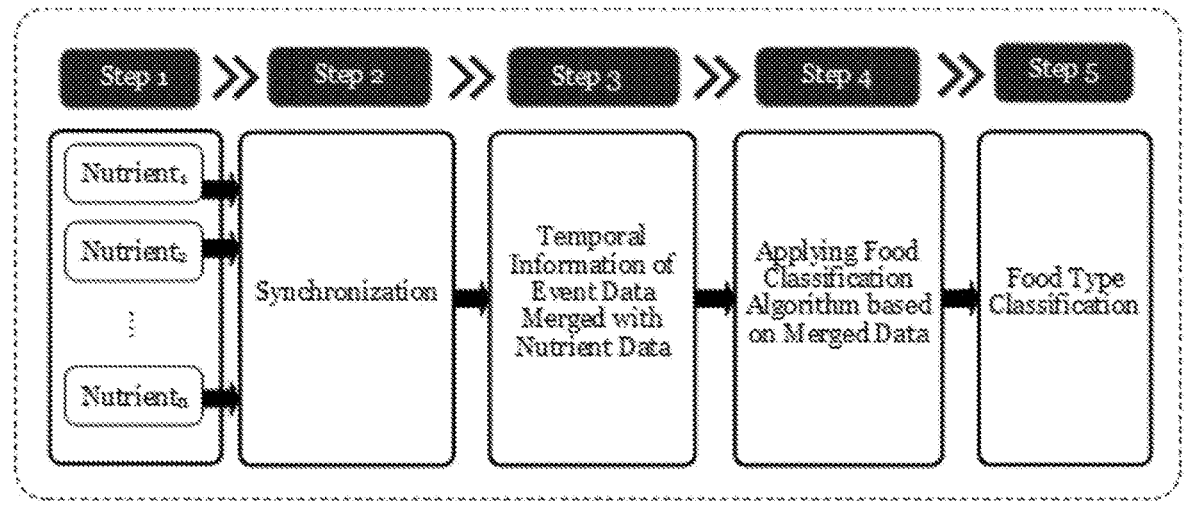
FIG. 24. Stepwise procedure for food detection.
Figure 25:
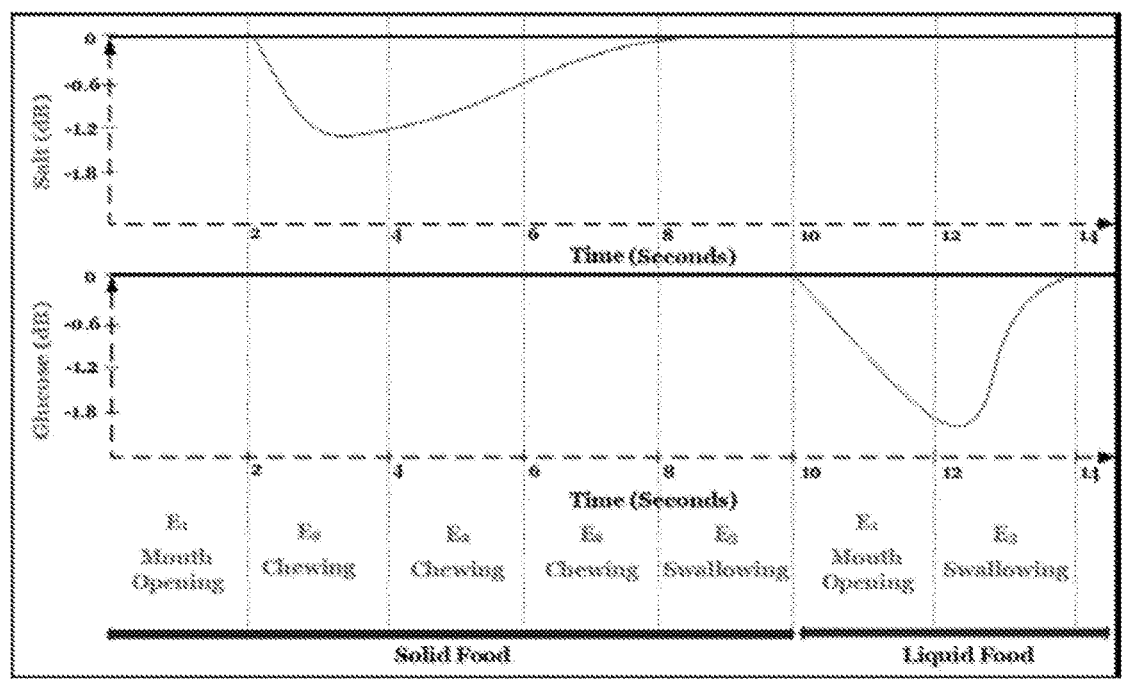
FIG. 25. Merging of temporal information of events with nutrient data.

Development of dietary and nutrition classification procedures. This section describes the proposed sequential stages in a 'Food Detection Block' (implemented in Python). The final output of this block is the classification of intake food type. FIG. 24 shows the proposed stepwise procedure for food type classification. The first stage of food detection can start with the collection of nutrient data. Then it passes the data to the next stage for synchronization. The second stage synchronizes data based on their starting points. The third stage can merge the temporal information of the event data obtained from the stage 6 of event detection with the synchronized nutrient data obtained from stage 2. The reason for this merging of event and nutrient data is that the temporal information of eating events can add more information along with the nutrient data to classify the type of food. The fourth stage can apply the food classification procedure, which can make use of both the nutrient and temporal information of the event data to determine the type of food via fused data points. This data can be displayed in a simple-to-read format as shown in FIG. 25.

Within this aspect of development, in-vitro validation of the in-mouth sensors/module can be performed to single and multiple nutrients. Initially testing of devices can be performed in artificial saliva with changing concentrations of a single nutrient. Next, sensors can be subjected to specified mixtures of nutrients. Specifically, nutrient-1 concentration can be held constant, and nutrient-2 concentration can be modulated over time. Base nutrient concentration can be: salt—50% phosphate-buffered saline (PBS), alcohol/vegetable oil—20%, and glucose—50 g/L. As an example of one multiplexing experiment, salt can be held at 50% PBS, and successive addition is made of increments oil to the solution with mixing. For the characterization experiments, the spectral response of sensors can be verified via a bench-top network analyzer (up to about 40 GHz).

Objectives Include:
 Implementation and development of stepwise procedure for food detection.
 Collection of spectral data generated by interlayer-RFid bio sensors and/or completed in-mouth module to single and multi-nutrient liquids.

Training of machine learning procedures on interlayer-RFid bio sensor and in-mouth module data.

Validation of 2-component prototype, and collection of multi-modal data from an in-vitro model.

Example Embodiments

In some embodiments according to a first aspect, a system for tracking diet and nutrition includes: (1) an oral module configured to be affixed within a mouth of a user; and (2) a body module configured to be affixed adjacent to a body part of the user, such as a neck of the user.

In some embodiments according to the first aspect, the oral module includes a set of salivary sensors responsive to a level of at least one nutrient. In some embodiments, the set of salivary sensors includes multiple salivary sensors responsive to levels of different nutrients. In some embodiments, each of the set of salivary sensors includes a pair of split-ring resonators and a sensing interlayer disposed between the pair of split-ring resonators.

In some embodiments according to the first aspect, the oral module further includes a probe antenna and a read-out circuit connected to the probe antenna, and the read-out circuit is configured to probe the set of salivary sensors through the probe antenna, and generate an output signal corresponding to the level of the at least one nutrient. In some embodiments, the read-out circuit includes a phase-locked loop and a transconductance block, which are configured to generate a probe signal applied to the set of salivary sensors through the probe antenna, and the read-out circuit includes an amplitude detector to detect a response signal from the set of salivary sensors through the probe antenna.

In some embodiments according to the first aspect, the oral module further includes a wireless communication unit and a microcontroller connected to the read-out circuit and the wireless communication unit, and the microcontroller is configured to derive information regarding the level of the at least one nutrient from the output signal of the read-out circuit. In some embodiments, the microcontroller is configured to direct the wireless communication unit to convey the information regarding the level of the at least one nutrient.

In some embodiments according to the first aspect, the oral module is configured as a tooth patch, tooth tattoo, or tooth cap to be affixed to a tooth of the user.

In some embodiments according to the first aspect, the body module includes a set of eating event sensors responsive to an eating event. In some embodiments, the set of eating event sensors is responsive to either of, or both, jaw movement and throat swallowing. In some embodiments, the body module includes a first set of eating event sensors responsive to jaw movement, and a second set of eating event sensors responsive to throat swallowing. In some embodiments, the body module includes a strain gauge responsive to jaw movement. In some embodiments, the body module includes either of, or both, a piezoelectric sensor and an acoustic sensor responsive to throat swallowing.

In some embodiments according to the first aspect, the body module further includes a wireless communication unit and a microcontroller connected to the set of eating event sensors and the wireless communication unit, and the microcontroller is configured to derive information regarding the eating event from output signals of the set of eating event sensors. In some embodiments, the microcontroller of the body module is configured to direct the wireless communication unit of the body module to convey information regarding the eating event. In some embodiments, the microcontroller of the body module is configured to direct the wireless communication unit of the body module to supply power to the oral module.

In some embodiments according to the first aspect, the body module is configured as a neck patch to be affixed to a neck of the user.

In some embodiments according to the first aspect, the set of eating event sensors includes multiple eating event sensors, and the microcontroller of the body module is configured to detect eating activities from output signals of the multiple eating event sensors. In some embodiments, the microcontroller of the body module is configured to detect the eating activities by extracting features from respective ones of the output signals, fusing or merging the extracted features, and detecting the eating activities from the fused or merged features. In some embodiments, the microcontroller of the body module is configured to detect the eating activities by executing a machine learning procedure. In some embodiments, the microcontroller of the body module is configured to identify temporal information associated with the eating activities.

In some embodiments according to the first aspect, the microcontroller of the body module is configured to identify a food composition or consistency by fusing or merging the information regarding the level of the at least one nutrient and the temporal information associated with the eating activities.

In some embodiments according to the first aspect, the system further includes a visual module, and the visual module includes a camera configured to acquire a set of images of a food intake.

In some embodiments according to the first aspect, the visual module further includes a wireless communication unit and a microcontroller connected to the camera and the wireless communication unit, and the microcontroller is configured to derive information regarding the food intake from the set of images. In some embodiments, the microcontroller of the visual module is configured to identify the food intake from the set of images. In some embodiments, the microcontroller of the visual module is configured to derive an extent of the food intake from the set of images. In some embodiments, the microcontroller of the visual module is configured to direct the wireless communication unit of the visual module to convey the information regarding the food intake. In some embodiments, the microcontroller of the visual module is configured to identify a food composition or consistency by fusing or merging the information regarding the food intake with at least one of: (a) the information regarding the level of the at least one nutrient or (b) the information regarding the eating event.

In some embodiments according to the first aspect, the visual module is configured as smart glasses.

In additional embodiments, certain components explained above with respect to an oral module and a body module can be integrated within a single or common module, such as the oral module. In particular, in some embodiments according to a second aspect, a system for tracking diet and nutrition includes an oral module configured to be affixed within a mouth of a user.

In some embodiments according to the second aspect, the oral module includes a set of salivary sensors responsive to a level of at least one nutrient. In some embodiments, the set of salivary sensors includes multiple salivary sensors responsive to levels of different nutrients. In some embodiments, each of the set of salivary sensors includes a pair of split-ring resonators and a sensing interlayer disposed between the pair of split-ring resonators.

In some embodiments according to the second aspect, the oral module further includes a probe antenna and a read-out circuit connected to the probe antenna, and the read-out circuit is configured to probe the set of salivary sensors through the probe antenna, and generate an output signal corresponding to the level of the at least one nutrient.

In some embodiments according to the second aspect, the oral module further includes a set of eating event sensors responsive to an eating event. In some embodiments, the set of eating event sensors is responsive to either of, or both, jaw movement and throat swallowing. In some embodiments, the body module includes a first set of eating event sensors responsive to jaw movement, and a second set of eating event sensors responsive to throat swallowing. In some embodiments, the set of eating event sensors includes a mechano-acoustic sensor, such as an accelerometer.

In some embodiments according to the second aspect, the oral module further includes a wireless communication unit and a microcontroller connected to the set of salivary sensors, the set of eating event sensors, and the wireless communication unit, and the microcontroller is configured to derive information regarding the level of the at least one nutrient from the output signal of the read-out circuit and derive information regarding the eating event from output signals of the set of eating event sensors. In some embodiments, the microcontroller is configured to direct the wireless communication unit to convey the information regarding the level of the at least one nutrient and convey the information regarding the eating event.

In some embodiments according to the second aspect, the microcontroller is configured to detect eating activities from the output signals of the set of eating event sensors. In some embodiments, the microcontroller is configured to detect the eating activities by extracting features from the output signals, fusing or merging the extracted features, and detecting the eating activities from the fused or merged features. In some embodiments, the microcontroller is configured to detect the eating activities by executing a machine learning procedure. In some embodiments, the microcontroller is configured to identify temporal information associated with the eating activities.

In some embodiments according to the second aspect, the microcontroller is configured to identify a food composition or consistency by fusing or merging the information regarding the level of the at least one nutrient and the temporal information associated with the eating activities.

In some embodiments according to the second aspect, the oral module is configured as a tooth patch, tooth tattoo, or tooth cap to be affixed to a tooth of the user.

In some embodiments according to the second aspect, the system further includes a visual module, and the visual module includes a camera configured to acquire a set of images of a food intake.

In some embodiments according to the second aspect, the visual module further includes a wireless communication unit and a microcontroller connected to the camera and the wireless communication unit, and the microcontroller is configured to derive information regarding the food intake from the set of images. In some embodiments, the microcontroller of the visual module is configured to identify the food intake from the set of images. In some embodiments, the microcontroller of the visual module is configured to derive an extent of the food intake from the set of images. In some embodiments, the microcontroller of the visual module is configured to direct the wireless communication unit of the visual module to convey the information regarding the food intake. In some embodiments, the microcontroller of the visual module is configured to identify a food composition or consistency by fusing or merging the information regarding the food intake with at least one of: (a) the information regarding the level of the at least one nutrient or (b) the information regarding the eating event.

In some embodiments according to the second aspect, the visual module is configured as smart glasses.

In some embodiments according to a third aspect, a computer-implemented method for tracking diet and nutrition of a user includes: (1) detecting eating activities from output signals of a set of eating event sensors affixed to the user; (2) identifying temporal information associated with the eating activities; (3) deriving information regarding a level of at least one nutrient consumed during the eating activities from output signals of a set of salivary sensors and (4) fusing or merging the information regarding the level of the at least one nutrient and the temporal information associated with the eating activities to identify a composition or consistency of a food consumed during the eating activities.

In some embodiments according to the third aspect, the set of eating event sensors includes multiple eating event sensors, and detecting the eating activities includes: extracting features from respective ones of the output signals, fusing or merging the extracted features, and detecting the eating activities from the fused or merged features.

Some embodiments of this disclosure relate to a non-transitory computer-readable storage medium having computer-readable code or instructions thereon for performing various computer-implemented operations. The term "computer-readable storage medium" is used to include any medium that is capable of storing or encoding a sequence of instructions or computer code for performing the operations, methodologies, procedures, and techniques described herein. The media and computer code may be those specially designed and constructed for the purposes of the embodiments of the disclosure, or they may be of the kind available to those having skill in the computer software arts. Examples of computer-readable storage media include volatile and non-volatile memory for storing information. Examples of memory include semiconductor memory devices such as erasable programmable read-only memory (EPROM), electrically erasable programmable read-only memory (EEPROM), random-access memory (RAM), and flash memory devices, discs such as internal hard drives, removable hard drives, magneto-optical, compact disc (CD), digital versatile disc (DVD), and Blu-ray discs, memory sticks, and the like.

Examples of computer code include machine code, such as produced by a compiler, and files containing higher-level code that are executed by a processor using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computing device) to a requesting computer (e.g., a client computing device or a different server computing device) via a transmission channel. Another embodiment of the disclosure may be implemented in hardwired circuitry in place of, or in combination with, processor-executable software instructions.

As used herein, the singular terms "a," "an," and "the" may include plural referents unless the context clearly dictates otherwise. Thus, for example, reference to an object may include multiple objects unless the context clearly dictates otherwise.

As used herein, the term "set" refers to a collection of one or more objects. Thus, for example, a set of objects can include a single object or multiple objects.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, a first numerical value can be "substantially" or "about" the same as or equal to a second numerical value if the first numerical value is within a range of variation of less than or equal to ±10% of the second numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A system for tracking diet and nutrition, comprising:
    an oral module configured to be affixed within a mouth of a user and including a set of salivary sensors responsive to a level of at least one nutrient; and
    a body module configured to be affixed adjacent to a body part of the user and including a set of eating event sensors responsive to an eating event,
    wherein the oral module further includes a probe antenna and a read-out circuit connected to the probe antenna, and the read-out circuit is configured to probe the set of salivary sensors through the probe antenna, and generate an output signal corresponding to the level of the at least one nutrient, and
    wherein the read-out circuit includes a phase-locked loop and a transconductance block, which are configured to generate a probe signal applied to the set of salivary sensors through the probe antenna, and the read-out circuit includes an amplitude detector to detect a response signal from the set of salivary sensors through the probe antenna.

2. The system of claim 1, wherein the set of salivary sensors includes multiple salivary sensors responsive to levels of different nutrients.

3. The system of claim 1, wherein each of the set of salivary sensors includes a pair of split-ring resonators and a sensing interlayer disposed between the pair of split-ring resonators.

4. The system of claim 1, wherein the oral module further includes a wireless communication unit and a microcontroller connected to the read-out circuit and the wireless communication unit, and the microcontroller is configured to derive information regarding the level of the at least one nutrient from the output signal of the read-out circuit.

5. The system of claim 4, wherein the body module further includes a wireless communication unit and a microcontroller connected to the set of eating event sensors and the wireless communication unit of the body module, and the microcontroller of the body module is configured to derive information regarding the eating event from output signals of the set of eating event sensors.

6. The system of claim 5, wherein the microcontroller of the body module is configured to direct the wireless communication unit of the body module to supply power to the oral module.

7. The system of claim 5, wherein the set of eating event sensors includes multiple eating event sensors, and the microcontroller of the body module is configured to detect eating activities from output signals of the multiple eating event sensors.

8. The system of claim 7, wherein the body module includes a strain gauge responsive to jaw movement, and either of, or both, a piezoelectric sensor and an acoustic sensor responsive to throat swallowing.

9. The system of claim 7, wherein the microcontroller of the body module is configured to detect the eating activities by extracting features from respective ones of the output signals, fusing or merging the extracted features, and detecting the eating activities from the fused or merged features.

10. The system of claim 7, wherein the microcontroller of the body module is configured to identify temporal information associated with the eating activities.

11. The system of claim 10, wherein the microcontroller of the body module is configured to identify a food composition or consistency by fusing or merging the information regarding the level of the at least one nutrient and the temporal information associated with the eating activities.

12. The system of claim 5, further comprising a visual module, and wherein the visual module includes a camera configured to acquire a set of images of a food intake.

13. The system of claim 12, wherein the visual module further includes a wireless communication unit and a microcontroller connected to the camera and the wireless communication unit of the visual module, and the microcontroller is configured to derive information regarding the food intake from the set of images.

14. The system of claim 13, wherein the microcontroller of the visual module is configured to identify the food intake from the set of images.

15. The system of claim 13, wherein the microcontroller of the visual module is configured to derive an extent of the food intake from the set of images.

16. The system of claim 13, wherein the microcontroller of the visual module is configured to identify a food composition or consistency by fusing or merging the information regarding the food intake with at least one of: (a) the information regarding the level of the at least one nutrient or (b) the information regarding the eating event.

* * * * *